United States Patent [19]

Lo et al.

[11] Patent Number: 5,640,393
[45] Date of Patent: Jun. 17, 1997

[54] MULTIPLE ADDRESS SECURITY ARCHITECTURE

[75] Inventors: William Lo, Santa Clara; Ian Crayford, San Jose, both of Calif.

[73] Assignee: Advanced Micro Devices, Inc., Sunnyvale, Calif.

[21] Appl. No.: 460,319

[22] Filed: Jun. 2, 1995

[51] Int. Cl.$^6$ .............................. H04L 9/00; H04L 12/22
[52] U.S. Cl. .............................. 370/392; 370/501; 380/49
[58] Field of Search .............................. 370/97, 75, 85.1, 370/85.2, 85.3, 85.4, 85.5, 85.13, 85.14, 94.1, 94.2, 94.3; 380/23, 25, 49, 50

[56] References Cited

U.S. PATENT DOCUMENTS

| | | | |
|---|---|---|---|
| 5,177,788 | 1/1993 | Schanning et al. | 380/49 |
| 5,265,123 | 11/1993 | Vijeh et al. | |
| 5,353,353 | 10/1994 | Vijeh et al. | |

FOREIGN PATENT DOCUMENTS

0431751A1  6/1991  European Pat. Off. .
WO/92/17963 10/1992  WIPO .
WO/95/01023  1/1995  WIPO .

*Primary Examiner*—Wellington Chin
*Assistant Examiner*—Soon Dong Hyun
*Attorney, Agent, or Firm*—Townsend and Townsend and Crew LLP

[57] ABSTRACT

A secure repeater implementing data packet masking includes a programmable and selective, on a per port basis, disrupt response responsive to any of several selectable qualifying conditions. A disrupt controller receives signals indicating various characteristics of fields of a data packet, and other conditions. A register bank includes a plurality of memories, one associated with each port and some of the conditions, assists the disrupt controller to determine the associated port's disrupt response to the data packet. Each memory stores a disrupt control code. When the disrupt control code for a particular port has a value indicating that the associated port is enabled, deassertion of a condition signal associated with that control code results in disruption of a data packet. A cell array permits simple, efficient scaling and formation of integrated semiconductor structures to implement complex disrupt logic equations.

49 Claims, 9 Drawing Sheets

MULTIPLE ADDRESS SECURITY ARCHITECTURE

CROSS-REFERENCE TO RELATED APPLICATIONS

This application is related to "Expandable Repeater", U.S. Pat. No. 5,265,123 issued on Nov. 23, 1993," "Address Tracking Over Repeater Based Networks", U.S. Pat. No. 5,353,353 issued on Oct. 10, 1994, "Repeater Security System," U.S. patent application Ser. No. 08/053,797 filed Apr. 26, 1993, "Programmable Source Address Locking Mechanism for Secure Networks," U.S. patent application Ser. No. 08/337,634 filed Nov. 10, 1994, "Programmable Address Mapping Matrix for Secure Networks," U.S. patent application Ser. No. 08/366,809, filed Dec. 30, 1994, "Programmable Disrupt of Multicast Packets for Secure Networks," U.S. patent application Ser. No. 08/366,806, filed Dec. 30, 1994, "Inverse Packet Disrupt for Secure Networks," U.S. patent application Ser. No. 08/406,082, filed Mar. 17, 1995, all hereby expressly incorporated by reference for all purposes.

BACKGROUND OF THE INVENTION

The present invention relates generally to data packet security within a local area network and more specifically to an improved secure computer network having selectable packet disrupt within a network that uses multiport secure repeaters.

Networks of computers are commonly used in today's business environment. One common network system structure uses one or more repeaters. The repeater typically includes several ports. A particular data packet received at one port is retransmitted to the other ports of the repeater. Each repeater restores timing and amplitude degradation of data packets received on one port and retransmits them to all other ports, and hence over the network. For networks employing a CSMA/CD-type of network, such as an Ethernet network, every data packet passes through every repeater. Network administrators are thereby able to conveniently use each repeater as a device on the network from which to gather information concerning the operation of the network.

In traditional Ethernet (802.3 10BASE5) and Cheapernet (802.3 10BASE2), a coaxial cable provides a linear bus to which all nodes of a local area network are connected. A standard promulgated by the IEEE (IEEE Standard 802.3) defines various functionality for computer networks. This standard is expressly incorporated by reference for all purposes. Signaling is accomplished using a current synch technique wherein a center conductor of the coaxial cable is used for a signal and a shield conductor of the coaxial cable is used for a reference voltage (typically ground). Twisted pair Ethernet (802.3 10BASE-T) uses a standard voice grade telephone cable rather than the coaxial cable. The telephone cable uses separate pairs of conductive wires for transmission and reception.

When using twisted pair Ethernet, the network configuration is a star topology. The star topology provides for several end stations or data terminal equipment (DTE) devices all coupled to a multi-port repeater located at a center of the star. The repeater performs signal amplitude and timing restoration. The repeater receives a bitstream at one of its ports and restores signal amplitude levels and timing requirements to all appropriate output ports. The repeater repeats the reshaped and retimed input bitstream to all of its other ports. In one sense, the repeater acts as a logical coaxial cable, permitting every node connected to the twisted pair network to receive each transmission from any other node, just as when a coaxial cable is used. The pairs of conductors use differential signaling, one pair for transmission and another pair for reception.

While a repeater is used in a traditionally wired coaxial Ethernet network as a mechanism to extend the physical distance limit of the network, in the IEEE 802.3 10BASE-T, the standard mandates the use of a repeater to provide connectivity between nodes whenever more than two nodes are present. Although physical signaling on the cabling differs between the traditional Ethernet-type of repeater and the twisted pair-type of repeater, the functionality of the repeaters are identical, as is the frame or packet format that is used to pass messages between the participating nodes on the network.

The packet commences with a preamble sequence which is an alternating ("1" and "0") pattern. The preamble sequence provides a single frequency on the network, in this case five MegaHertz (MHz) at the start of each frame, allowing a receiver to acquire and lock onto the associated bitstream. The preamble sequence is followed by a start of frame identifier that immediately precedes the data portion of the transmission. Either a start of frame delimiter (802.3) or synch sequence (Ethernet) delineates the start of the data portion of the message. Following the start of frame identifier are two address fields: a destination address (DA) and a source address (SA). These addresses are both forty-eight bit values and are transmitted least significant bit (LSB) first.

A media access controller (MAC) associated with each DTE uses the destination address to determine whether an incoming packet is addressed to the node it is associated with. When a receiving node detects a match between its own node address and an address transmitted in the destination address field, it attempts to receive the packet. Nodes having a MAC that does not detect a matching address typically ignore a remainder of the packet.

There are three types of destination addressing supported by the 802.3 standards:

1. Individual. The DA field contains an individual and unique address assigned to a single node on the network.

2. Multicast. When the first bit (LSB) of the DA is set, the remainder of the DA includes a group address. The group of nodes that are actually addressed is determined by a higher layer function. In general, use of a group address is designed to transmit a message to a logically similar subset of nodes on the network.

3. Broadcast. The broadcast is a special form of multicast address wherein the DA field is set to all "1's." This address is reserved, and all nodes on the network must be capable of receiving a broadcast message.

The MAC that transmits a data packet writes its own address into the SA field. This allows the transmitting MAC to identify those packets which it originates. The 802.3 standards do not require that a receiving MAC take any action based upon the SA field. In some applications, such as management, security or configuration, the SA field may be tracked and monitored.

A two-byte length/type field follows the SA field. The choice of length or type is dependent upon whether the frame is compatible with the IEEE 802.3 or the Ethernet standard. The higher order byte of the length/type field is transmitted first, with the LSB of each byte transmitted first.

A data field contains actual packet data that is transferred between end stations and is between forty-six to fifteen hundred bytes in length. A logical link control (LLC) function is responsible for fragmenting data into block sizes suitable for transmission over the network. Data bytes are transmitted sequentially with the LSB of each byte transmitted first.

A frame check sequence (FCS) is a four-byte field that contains a cyclic redundancy check (CRC) for the entire frame. The transmitting station computes the CRC throughout the DA, the SA, the length/type field, and data field. The transmitting station appends the FCS as the last four bytes of the frame. A receiving station uses the same CRC algorithm to compute the CRC for a received frame. The receiving station compares the CRC value it computes with the CRC value in the transmitted FCS. A mismatch indicates an error, such as a corrupted data frame. CRC bits of the FCS are transmitted in order: most significant bit (MSB) to LSB.

FIG. 1 and FIG. 2 are diagrams illustrating frame formats for an IEEE 802.3 Standard compliant packet and an Ethernet packet, respectively. Comparing the packet formats illustrates that a primary difference between the packet types is that the start of frame delimiter (SFD) for 802.3 is defined as a byte that has a "1 0 1 0 1 0 1 1" pattern whereas the start frame (synch) of Ethernet is a "11" sequence. Even so, in both cases, a total number of bits for the preamble plus the start of frame indication is sixty-four bits long.

The 802.3 and Ethernet standards both specify that a frame must be in the range of sixty-four to fifteen hundred eighteen bytes (excluding preamble/SFD). However, the actual data field in the 802.3 system is permitted to be smaller than the forty-six byte value that is necessary to ensure this minimum size. To handle a smaller size data field, the MAC of a transmitting station appends pad characters to the LLC data field before sending data over the network. The Ethernet standard assumes that an upper layer ensures that the minimum data field is forty-six bytes before passing data to the MAC, therefore the existence of appended pad characters in unknown to the MAC implementing an Ethernet format.

The 802.3 standard also uses a length field that indicates the number of data bytes that are in the data field only. Ethernet, on the other hand, uses a type field in the same two bytes to identify the message protocol type. Since valid Ethernet type fields are always assigned outside of the valid maximum 802.3 packet length size, both 802.3 and Ethernet packets can coexist on the same network. Hence, it has been found that it is important to be able to track and monitor the addresses for a variety of reasons. For example, for secure networks it may be important that authentication is required to ensure that the appropriate nodes on the network receive the information. In addition, as networks change in the number of nodes attached thereto, it becomes important to be able to associate an address with a particular port or the like within the network.

It is also important in secure networks to selectively prevent a node from receiving such address and/or data information unless the node requires the information. If a data packet is not destined for a particular node, the particular node generally does not have a need for information within the data packet.

Further, it is important to provide a mechanism to associate each port of a repeater with the actual addresses or identity of the device(s) connected to that port. Typically, unsecured repeaters are devices that are just used for signal amplitude and timing restoration. In all of the above-mentioned modes, the secure repeater must also be provided with the capability to detect and interpret the various fields within data packets that are transmitted on the network.

As described above, every data packet transmitted in the computer network includes a destination address to identify the recipient of the data packet. A secure repeater in a secure network may have one or more end stations attached to each port. Each end station has at least one unique address assigned, and possibly one or more multicast addresses. The secure repeater maintains a list of associated end stations for each output port. The security systems identified in the incorporated references use the destination address field from each data packet to route a data packet to only those output ports associated with the destination address. Output ports of the secure repeater associated with a destination address not matching the destination address receive a modified, or disrupted, data packet. In the preferred embodiment of the secure environment, it is common not to begin disruption until after the destination address field has been transmitted. In other words, every field following the destination address (from the source address on) is disrupted.

The disrupt mechanisms for enhancing computer network security are designed to scramble a data packet transmitted to those end-users that are not intended recipients of the data packet. Conceptually, it is relatively easy to implement data packet disruption since the address of end-user station(s) connected to the repeater can be learned (e.g., the repeater can read and store the source address extracted from data packets received from the end-user station), and thereafter a comparison of a destination address from a received packet and the learned addresses controls distribution and disruption of the data packets to the various end-user stations.

Actually implementing such a security system is more difficult due to a number of known difficulties. A first difficulty is that the repeater needs enough storage locations, per port, as there are likely to be end-stations connected via that port. For ports of the repeater that are connected to another repeater, or to a multi-drop segment (such as coax), then potentially many addresses are associated with a port and need to be stored. Actual topology of the network is unknown to the repeater, thus the number of storage locations is multiplied by the number of ports.

A second difficulty is that multicast packets that a repeater receives must be propagated to all members of the group. Sometimes a group is divided across multiple repeaters. An inter-repeater link, the connection between a port of two repeaters, should pass the multicast packet on to the group members on other repeaters. To avoid passing multicast packets that should not be forwarded, such as where no members of the group are coupled to the inter-repeater link, the port associated with the inter-repeater link should be capable of storing all multicast addresses that exist on the other repeater.

A third difficulty is that some addresses, either individual or multicast, will be known to a secure repeater, and some will not be known. Packets having unknown addresses should be transmitted across inter-repeater links since the end station associated with the unknown address may exist on the other repeater, or on still another repeater connected to the other repeater, or somewhere else in the network. However, the first two problems typically require excessive memory requirements for a repeater, especially should addresses connected to inter-repeater links be desired to be stored. Because not all addresses can be stored, inter-repeater links are typically unsecured, and forward all data packets undisrupted. This solution defeats the security features and is therefore undesirable.

Some of the incorporated patents and patent applications address specific features for implementing one or more aspects of controlling data packet disruption. The solutions disclosed in the various patent applications describe preferred embodiments for the various specific problems. When combining these features into a single integrated repeater having generalized, selectable disrupt features that are controllable on a per-port basis, implementation can become complex. This is especially true of integrated repeaters implementing an embodiment of the invention described in the incorporated patent addressing use of an expansion bus to permit multiple integrated repeaters to interoperate as a single repeater with an increased number of ports. Adding the security features of the present invention complicates combination of several integrated multiport repeaters into a single logical repeater.

SUMMARY OF THE INVENTION

The present invention provides apparatus and method for simply and efficiently addressing the problems regarding secure repeater disruption of a data packet.

In the preferred embodiment, multiple address locations are available for the storage of a particular field, e.g., the source address field, of end-stations attached to the various ports of a secure repeater. This permits ports attached to multiple end-stations, and devices possessing multiple addresses (either individual addresses or multicast addresses). The address storage locations are divided into dedicated address groups, such as assigning a fixed number of address storage locations to each port, and assigning a remainder of the storage locations to a storage pool. Address storage locations in the storage pool may be assigned to any port, or to multiple ports.

Individual or multicast addresses may be stored in any of the fixed or storage pool locations, and when stored in the storage pool, may be assigned multiple ports. Thus, all members of a group connected to a repeater receive a group addressed packet, and none of the other ports on the repeater receive the packet. Additionally, multicast addresses not having group members outside the repeater are recognized so that the repeater disrupts the multicast packet across any inter-repeater links.

Addresses known to be connected to a repeater permit the repeater to disrupt further transmission of the data packet beyond the particular repeater and the appropriate end-station.

In some instances, delay of data packet disruption is controllable so that desired address field information (destination address or destination address and source address) is passed undisrupted when using conventional network monitoring and analysis equipment on the secure network.

These security enhancements operate with respect to discrete repeater packages, individually, as well as when combined with other discrete repeater packages to provide a single, logical repeater.

According to one aspect of the invention, it includes an apparatus for controlling, per port, disruption of a packet retransmitted from a secure repeater. In the preferred embodiment, a disrupt circuit used in a secure repeater independently controls retransmission of a packet from a port p of a plurality of ports of the repeater in response to a plurality of condition signals. The disrupt circuit includes a disrupter coupled to the port p for receiving the packet and for retransmitting the packet from the port p when a disrupt select signal has a first value and for retransmitting a disrupted packet from the port p when the disrupt select has a second value; and a disrupt controller, coupled to the disrupter and responsive to the plurality of condition signals, for controlling the disrupt select signal, wherein the disrupt select signal is controlled according to a desired logic format.

The disrupt controller may be implemented into a single, ordered, scaleable array having a plurality of rows (corresponding to condition signals) and a plurality of columns (corresponding to individual ports of the repeater). Simple addition of additional columns adds additional ports to the logic, and simple addition of additional rows adds capability for processing other condition signals. Similarly, columns may be deleted to remove ports, and rows may be deleted to remove conditions.

In the preferred embodiment, a condition (such as a match condition) is affected by a result of other condition tests. A sub-type of the standardized disrupt cells for responding to the match condition is disposed between an output of the disrupt array and the rows having the tests that influence the match condition. By adding rows on one side of the special condition cells for match, the condition is added into the match condition. Adding rows on another side of the match cells adds the condition (as a wired-OR function) without affecting the special condition check.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

DESCRIPTION OF THE PREFERRED EMBODIMENT

Figure 1:
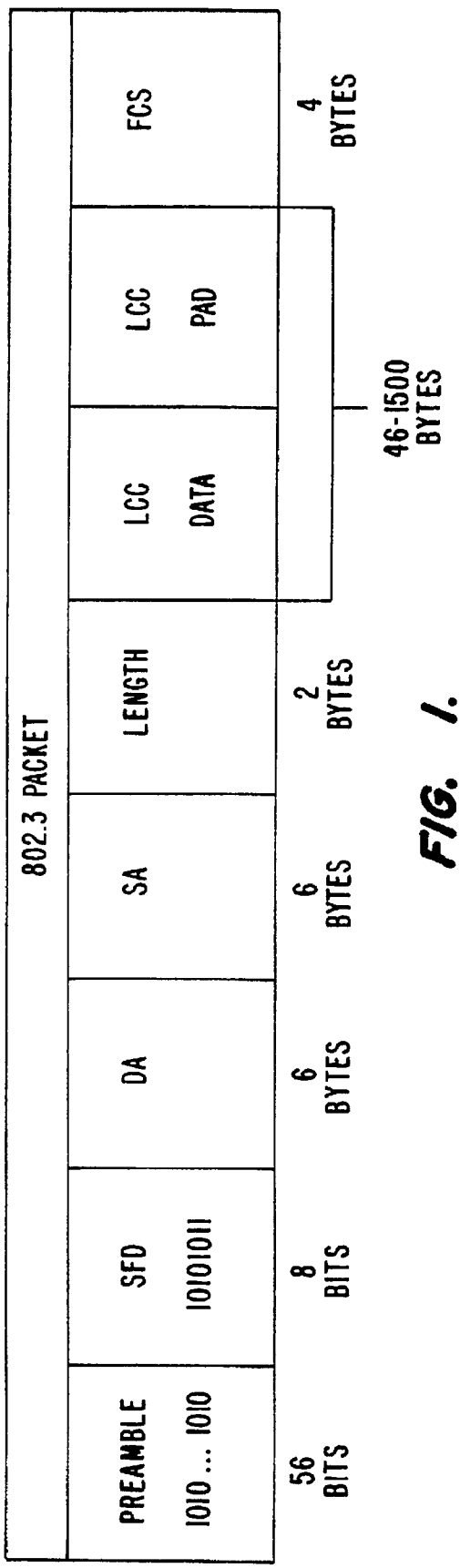
FIG. 1 is a diagram illustrating an IEEE 802.3 compliant packet format.
Figure 2:
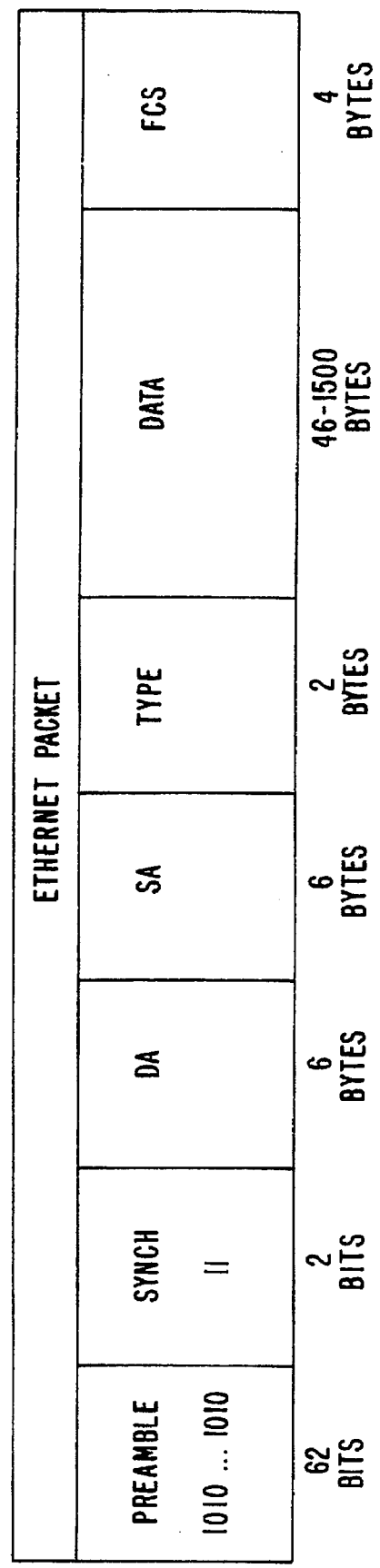
FIG. 2 is a diagram illustrating an Ethernet compliant packet format.
Figure 3:
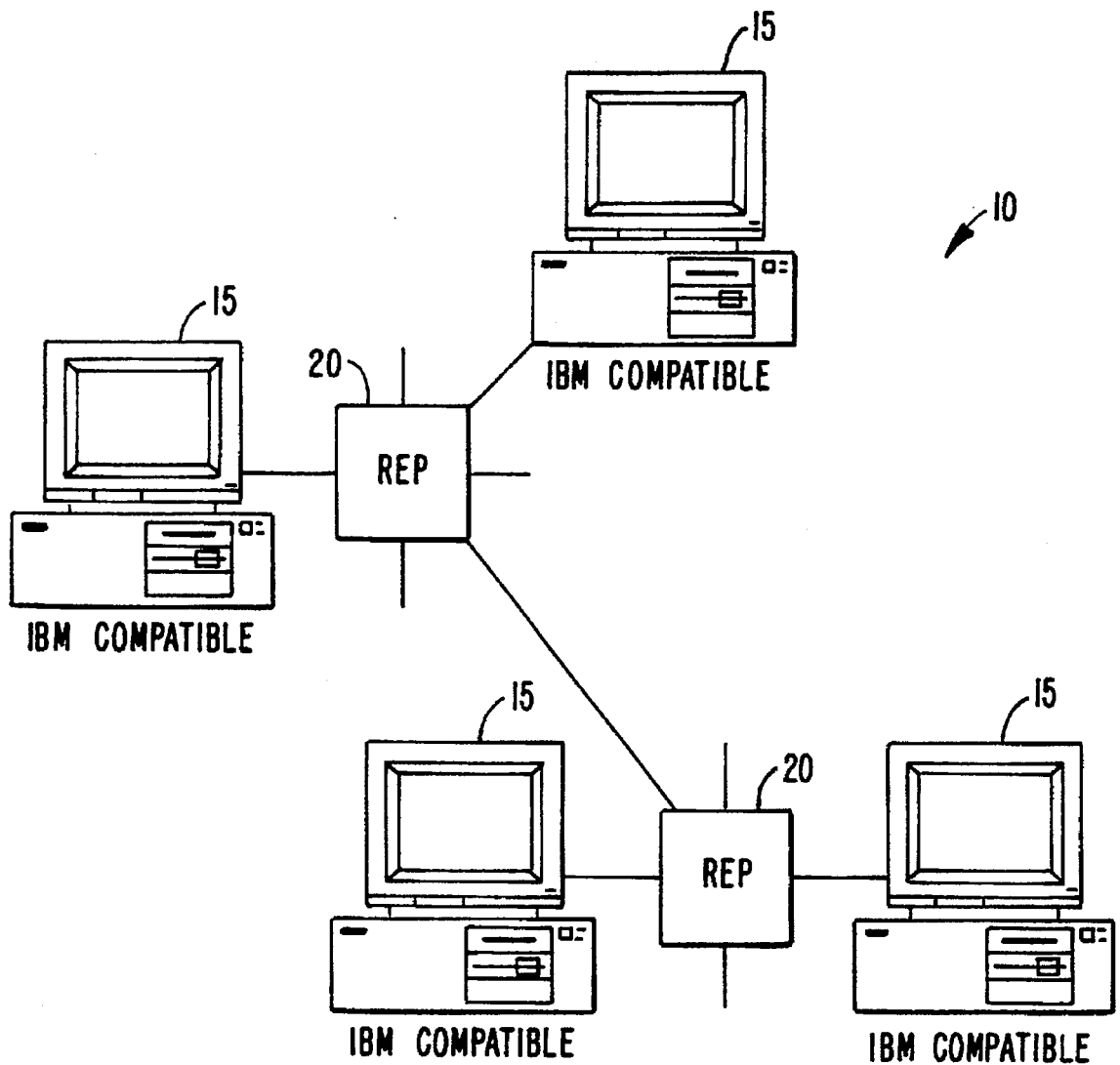
FIG. 3 is a block schematic diagram of a network of a plurality of personal computers implementing a star topology, the network including a secure repeater at each hub.

FIG. 3 is a block schematic diagram of a network 10 of a plurality of end stations 15 (e.g. personal computers) implementing a star topology, network 10 includes a secure repeater 20 at each hub. The preferred embodiment is implemented using a carrier sense multiple access with collision detection (CSMA/CD) compliant network. Secure repeater 20 conforms to the incorporated IEEE Standard 802.3.

In operation, network 10 passes a data packet from one end station 15, through one or more secure repeaters 20, to another end station 15. Secured repeater 20 receives the data packet at one port, and retransmits the data packet from other ports. Secure repeater 20 implements security features, such as data packet data masking, as described in the incorporated references.

Figure 4:
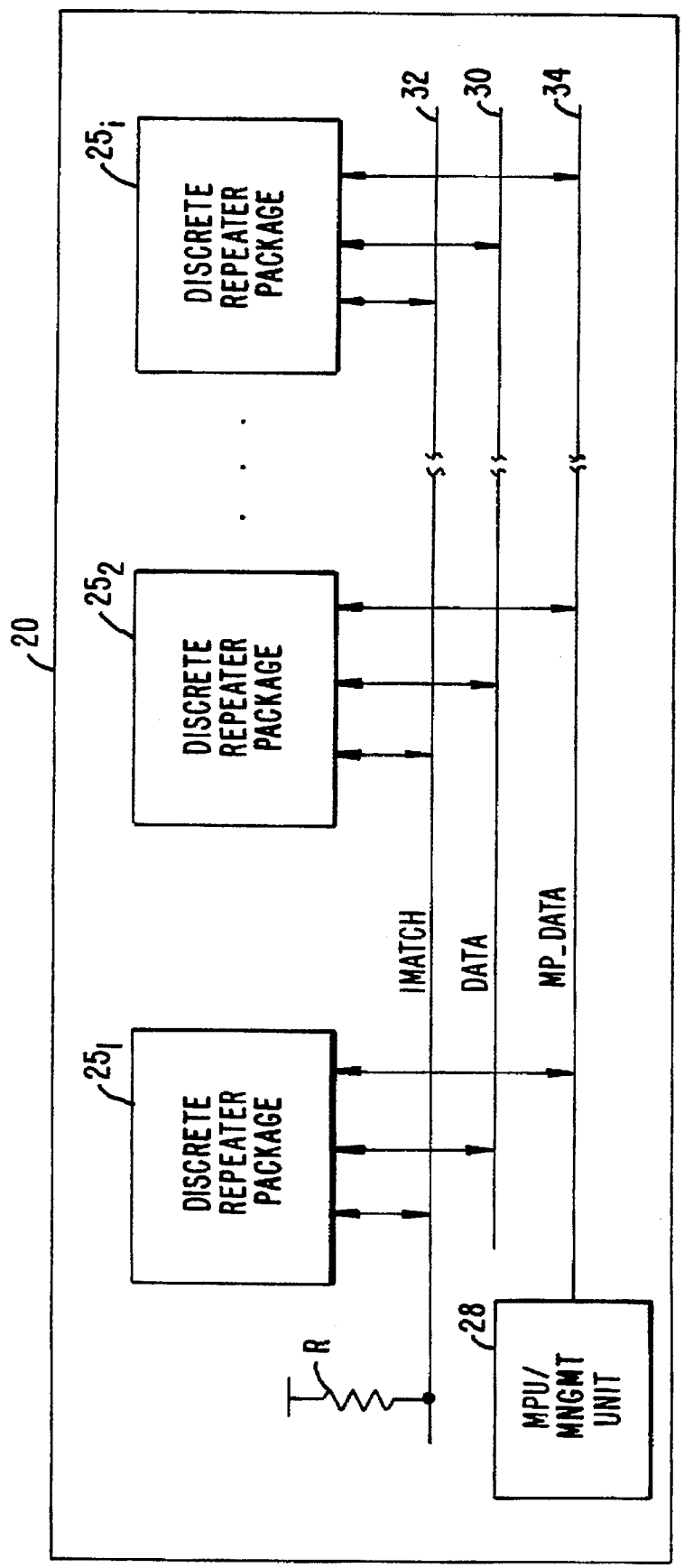
FIG. 4 is block schematic diagram of a secure repeater implemented as a combination of discrete repeater packages.

FIG. 4 is block schematic diagram of secure repeater 20 implemented as a combination of a plurality of discrete repeater packages $25_j$, j=1 to Y, and a microprocessor unit (MPU) and management unit 28. The plurality of discrete repeater packages $25_j$ are coupled to each other by an expansion bus including a data bus 30 and a no match bus 32. Details regarding data bus 30 are further described in the incorporated U.S. patent describing the expandable repeater. No match bus 32 carries a !MATCH signal. No match bus 32 is implemented using open drain drivers in each discrete repeater package 25 coupled to resistor R. No match bus 32 permits each discrete repeater package 25 to notify other packages 25 that an address match was found. This feature will be further explained below.

A MP_DATA bus 34 couples MPU/Management Unit 28 to each discrete repeater package 25. By use of MP_DATA bus 34, MPU/Management unit 28 reads and writes addresses, as well as selectively enables and disables various disruption features of secure repeater 20. As well known, MPU/Management unit 28 may include any one of a number of microprocessors/microcontrollers generally available, such as those manufactured and marketed by Advanced Micro Devices of Sunnyvale, Calif., for example.

Figure 5:
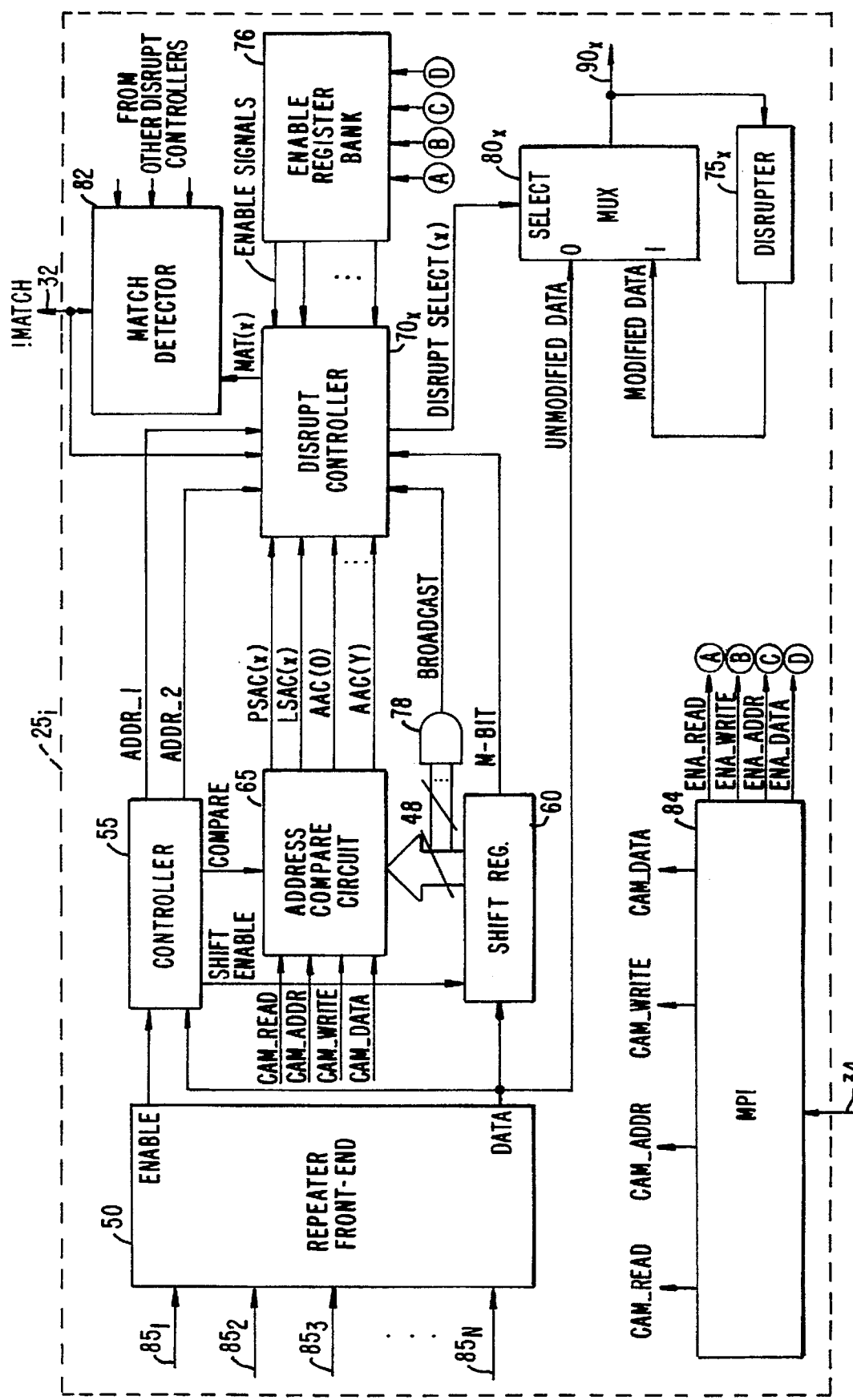
FIG. 5 is a detailed schematic block diagram of the secure repeater package implementing selective disrupt response.

FIG. 5 is a detailed schematic block diagram of discrete repeater package 25 shown in FIG. 4 implementing selective disrupt response. Discrete repeater package 25 includes a repeater front-end 50, a controller 55, a shift register 60, an address compare circuit 65, a plurality of programmable disrupt controllers $70_i$, a plurality of disrupters $75_i$, a register bank 76, a forty-eight input AND gate 78, a plurality of output data multiplexers $80_i$, a match detector 82, and a microprocessor interface 84.

For ease of explanation, only one programmable disrupt controller ($70_x$), one disrupter $75_x$, and one multiplexer $80_x$ are shown. It is understood that there is one disrupt controller, one disrupter and one multiplexer for every port of repeater package 25. Repeater front-end 50 receives a data packet at a particular one port of a plurality of input ports $85_i$, i=1 to n, with n being the number of ports. Repeater front-end 50 processes the data packet in conformance with the incorporated IEEE 802.3 standard. Repeater front-end 50 outputs an ENABLE signal and a DATA signal that is a serial output stream. DATA is driven with the data from the input data packet. ENABLE is asserted as long as repeater front-end 50 drives DATA with valid data from the data packet.

Controller 55 is coupled to repeater front-end 50 and receives the ENABLE signal and the DATA signal. As described in more detail below, controller 55 includes logic to assert a SHIFT_ENABLE signal, a COMPARE signal, a first address present signal (ADDR$_{13}$ 1) that is a DA_PRESENT signal in the preferred embodiment, and a second address present signal (ADDR_2) that is an SA_PRESENT signal in the preferred embodiment, all responsive to the ENABLE and DATA signals.

Shift register 60 is coupled to both repeater front-end 50 and controller 55. Shift register 60 is a right shifting register that receives DATA at its input. Shift register 60 is responsive to an assertion of the SHIFT_ENABLE signal to shift bits of DATA into its memory. Shift register 60 holds forty-eight bits (six bytes), corresponding to the size of the destination address in the data packet. The bits stored in shift register 60 are output on a forty-eight bit wide output.

The inputs of AND gate 78 receives these bits to check for whether the output bits indicate a broadcast address (all 1's). An output of AND gate 78 is the BROADCAST signal. When shift register 60 stores a broadcast address, AND gate 78 asserts the BROADCAST signal. The least significant bit of a stored address in shift register 60 is used to provide the MULTICAST signal. When shift register 60 stores a multicast address (least significant bit of the destination address is a 1), shift register 60 asserts the MULTICAST signal M-BIT.

Address compare circuit 65 is coupled to controller 55 and shift register 60. Address compare circuit 65 is an associative memory that associates one or more addresses with one or more output ports. Address compare circuit 65 of the preferred embodiment includes n number of preferred source address compare (PSAC(x)) output lines, n number of last source address compare (LSAC(x)) output lines, and z number of alternate address compare (AAC(y)) output lines, x=0 to n−1, and y=0 to z−1. In the preferred embodiment, n=16 and z=32, though other configurations may use other numbers.

There is one PSAC(x) and one LSAC(x) output line corresponding to each output port. Each of the AAC(x) output lines may be mapped to any port, or combination of ports. When COMPARE is asserted, address compare circuit 65 compares the forty-eight bits output from shift register 60 to the addresses stored in memory. For each match, address compare circuit 65 asserts a compare signal at an output line for the output line having an associated address matching the output of shift register 60. Any number, from zero to all, of the output lines may be asserted after the compare. Additional details regarding structure and operation of address compare circuit 65 are described in the incorporated references and the following discussion.

Each programmable disrupt controller $70_x$ is coupled to controller 55, shift register 60, address compare circuit 65, register bank 76, AND gate 78, and match detector 82. Each disrupt controller $70_x$ receives one of the PSAC signals (PSAC(x)) and a corresponding one of the LSAC signals (LSAC(x)), all of the AAC signals, all of the enable signals from register bank 76, a !MATCH signal from match detector 82, the BROADCAST signal, the MULTICAST signal (M-BIT), the ADDR_1 signal and the ADDR_2 signal from controller 55. In response to assertions of combinations of these various signals, disrupt controller $70_x$ drives a DISRUPT SELECT(x) signal either HIGH or LOW.

Disrupt controller $70_x$ drives DISRUPT SELECT(x) according to the following:

Before we discuss the security functions let us define the nomenclature of all the security related registers.

AA(n) —The value of the nth assignable address (48 bits for a destination address, for example)

AAE(n) —The value of the nth AA port enable vector where AAE(n,p) is the bit which corresponds to port p.

LSA(p) —The value of the last source address for port p. (48 bits)

LSAE —The value of the LSA port enable vector where LSAE(p) is the bit which corresponds to port p.

PSA(p) —The value of the preferred source address for port p. (48 bits)

PSAE —The value of the PSA port enable vector where PSAE(p) is the bit which corresponds to port p.

ENA —The value of the disrupt function enable vector where ENA(p) is the bit which corresponds to port p.

MULT —The value of the pass on multicast enable vector where MULT(p) is the bit which corresponds to port p.

NMAT —The value of the pass on no match enable vector where NMAT(p) is the bit which corresponds to port p.

DLY —The value of delay of disrupt function enable vector where DLY(p) is the bit which corresponds to port p.

DA —The incoming destination address. DA can be any 48 bit value. If all bits of the DA=1 then the DA is called a broadcast address. If the least significant bit of the DA=1 then the DA is called a multicast address.

All the registers above except DA are programmable by the user.

Note: All enable bits are assumed active HIGH (1=Enable) for the following discussion.

ADDR_1 —Asserted HIGH until the DA is fully retransmitted.

ADDR_2 —Asserted HIGH until the SA is fully retransmitted.

To provide security to a port it is assumed that port p will be disrupted unless at least one of the following conditions occur:

1) ENA(p) is disabled. A packet will not be disrupted on port p if the disrupt function is disabled.
2) DA=broadcast address. A packet with a broadcast address must by definition be sent to every station, therefore a disrupt should not occur.
3) LSAE(p)=enabled AND LSA(p)=DA. A packet should not be disrupted on a port if the packet is addressed to the station(s) connected to the port. MATCH=match if this condition occurs.
4) PSAE(p)=enabled AND PSA(p)=DA. A packet should not be disrupted on a port if the packet is addressed to the station(s) connected to the port. MATCH=match if this condition occurs.
5) AAE(n,p)=enabled AND AA(n)=DA for at least one n. A packet should not be disrupted on a port if the packet is addressed to the station(s) connected to the port. MATCH=match if this condition occurs.

The implications of this condition is the key to using the AA registers efficiently. First by enabling AAE(n,p) for several n's it is possible to assign up to as many SAs for a given port as there are assignable address registers (32_the preferred embodiment). This allows the AAs to be dynamically allocated to a given port that may have many stations attached to it. Second by enabling AAE(n,p) for several p's it is possible to share a AA with multiple ports. This allows a multicast address to be assigned to many ports while using only 1 AA 6) MULT(p)=enabled AND DA=multicast address. Sometimes it is desirable not to disrupt a port if a multicast address is detected. This function is provided such that the user has the option to pass all packets with multicast unmodified without programming the AAs, LSA(p) or PSA(p) with any of the multicast addresses.
7) NMAT(p)=enabled AND MATCH !=match. If there is not match between the DA and all of the AAs, LSAs, and PSAs that are enabled, port p will not be disrupted. This function allows the user to selectively pass packets unmodified without programming the AAs, LSA(p) or PSA(p) with any of the DA(s) connected to the port. This function is extremely useful in providing a secure port of a hub that is connected to a large number of stations, another hub, or the DA(s) of the station(s) attached to the port is unknown. The rationale for this feature is that if no match is found in any of the AAs, LSAs, and PSAs for the ports where the DAs are known then assuming the DA is a valid address the packet must go to at least one of the ports where the SAs are unknown and/or not fully specified explicitly in the AAs, LSAs, and PSAs. (It may be helpful to consider the inverse of this feature—in other words—if a DA does match any of the AAs, LSRs or PSAs, it must be destined for a physical port within the repeater, therefore, it should not be repeated to another port.) Note that SAs stored in an address compare circuit are matched (or compared) to DAs of received packet(s). In other words, an SA received on a port is stored and compared against DAs received from other packets.

8) ADDR_1=High The destination address should never be disrupted to prevent mis-addressing. (i.e., a disrupted destination address might actually match the address of a device on the network)
9) DLY(p)=Enabled and ADDR_2=High The source address field should not be disrupted on port p if DLY(p) is enabled and less than all bits of ADDR_2 of the frame have been repeated.

In summary, the disrupt function is disabled on port p if:
(ENA(p) is disabled) OR
(DA=broadcast address) OR
(LSAE(p)=enabled AND LSA(p)=DA) OR
(PSAE(p)=enabled AND PSA(p)=DA) OR
(AAE(n,p)=enabled AND AA(n)=DA for at least one n) OR
(MULT(p)=enabled AND DA=multicast address) OR
(NMAT(p)=enabled AND MATCH !=match) OR
(ADDR_1=High) OR (DLY(p)=enabled AND ADDR_2= High) where MATCH=match if
(LSAE(q)=enabled AND LSA(q)=DA for at least one q) OR
(PSAE(q)=enabled and PSA(q)=DA for at least one q) OR
(AAE(n,q)=enabled and AA(q)=DA for at least one permutation of n,q)

An equivalent way to describe this is disrupt port p only if:
(ENA(p) is enabled) AND
(DA !=broadcast address) AND
(LSAE(p)=disabled OR LSA(p) !=DA) AND
(PSAE(p)=disabled OR PSA(p) !=DA) AND
(AAE(n,p)=disabled OR AA(n) !=DA for all n) AND
(MULT(p)=disabled OR DA !=Multicast address) AND
NMAT (p)=disabled OR MATCH=match) AND
(ADDR_1=Low) AND (DLY(p)=disabled OR ADDR_2= Low)

Note that in the present implementation all 48 bits of the AAs, LSAs, and PSAs, are compared against the DA. To make things even more general, it is possible to add a corresponding 48 bit mask register for each AA, LSA, and PSA. Only the unmasked bits of the AA, LSA, and PSA will be compared against the DA. Note that condition 6 is a special case of masking in that it masks all bits but the multicast bit M-BIT in the DA.

Multi-repeater Hubs.

Given that there is only a finite number of ports per a repeater chip, multiple repeater chips can be connected together to form a single repeater with many ports, more than the limited ports on the single chip. In the preferred embodiment, an expansion bus according to the incorporated patent, provides this function. While the previous description identifies the disrupt function in terms of one repeater chip, the disrupt function in principle is scaleable across multiple repeater chips. In other words it is possible to distribute the circuitry across multiple repeater chips with some restrictions. For the sake of the following discussion we will assume that 3 repeater chips are connected together and each chip has 16 ports. This will form a 48 port logical repeater using a synchronous expansion bus with 3 sets of AAs, AAEs, LSAs, LSAEs, PSAs, PSAEs, ENAs, MULTs, and NMATs. Further, each chip is assumed to have 32 assignable addresses.

The rules for not disrupting a port are the same as above except the following.

Condition 5 should read AAE(n,p)=enabled AND AA(n)=DA for at least one n in the repeater that contains p. Each set of AA on a repeater chip can be mapped only to the ports on the same repeater, since it is not possible to map the AAs of one repeater to the ports of another repeater. The ramifications of this are that:

1) it is not possible to explicitly map more than 32 addresses per port, and
2) it is not possible to use one AA to hold one multicast address that maps to ports on different repeaters. In this case the multicast address must be mapped to one AA in each repeater that contains a port that the multicast address maps into.

Conditions 1, 2, 3, 4, 6, 7, 8 and 9 are on a per port basis and function identically to a single repeater case.

In the multi repeater case MATCH=match if
(LSAE(q)=enabled AND LSA(q)=DA for at least one q on any repeater chip) OR
(PSAE(q)=enabled AND PSA(q)=DA for at least one q on any repeater chip) OR
(AAE(n,q)=enabled AND AA(n)=DA for at least one permutation of n,q on any repeater chip)
where q=Port number The packet is always passed between the repeater chips undisrupted across the expansion port and each repeater detects multicast and broadcast independently. Note that the expansion port is only between the repeater chips and is not exposed to the network, so passing packets across the expansion port undisrupted does not pose any security problems. Each repeater chip also has its own set of security related registers. The only thing that remains to be passed is a signal that indicates whether a match occurred in a repeater chip. Because the match is a OR condition, a wired OR signal (! MATCH) can be passed amongst the repeater chips (FIG. 4).

The AA, LSA, and PSA can be read/written into address compare circuit 65 via CAMREAD, CAMWRITE, CAMADR, and CAMDATA of address compare circuit 65. Note that this address compare circuit 65 may or may not include masking registers. The received DA is loaded into the 48 bit shift register 60. Once the DA is loaded into the shift register, the value in the shift register is compared against all the addresses stored in address compare circuit 65. The result of the compare is sent out of address compare circuit 65 via the PSAC, LSAC, and AAC signals. A high indicates the compare was equal. If the value of the shift register is all is then the BROADCAST signal is set high indicating that the DA is a broadcast address. If the first bit that is shifted into the shift register is high then the MULTICAST signal is set high indicating the DA is a multicast address.

The enable register bank contains all the enable registers DLY, ENA, PSAE, LSAE, MULT, NMAT, and AAE. These registers can be read/written via ENAREAD, ENAWRITE, ENAADR, and ENADATA.

Figure 7:
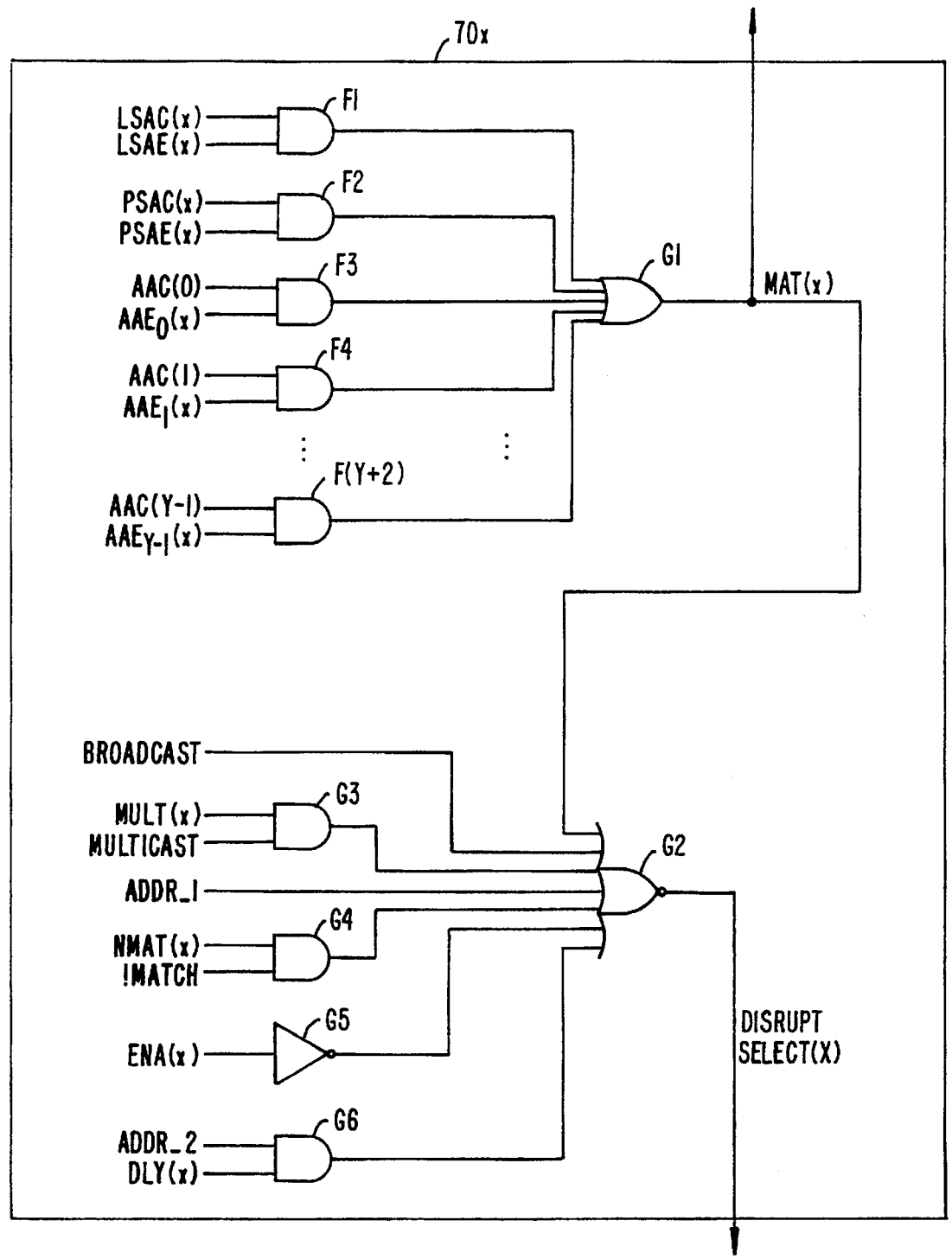
FIG. 7 is a detailed schematic diagram of the disrupt controller shown in FIG. 5.
Figure 8:
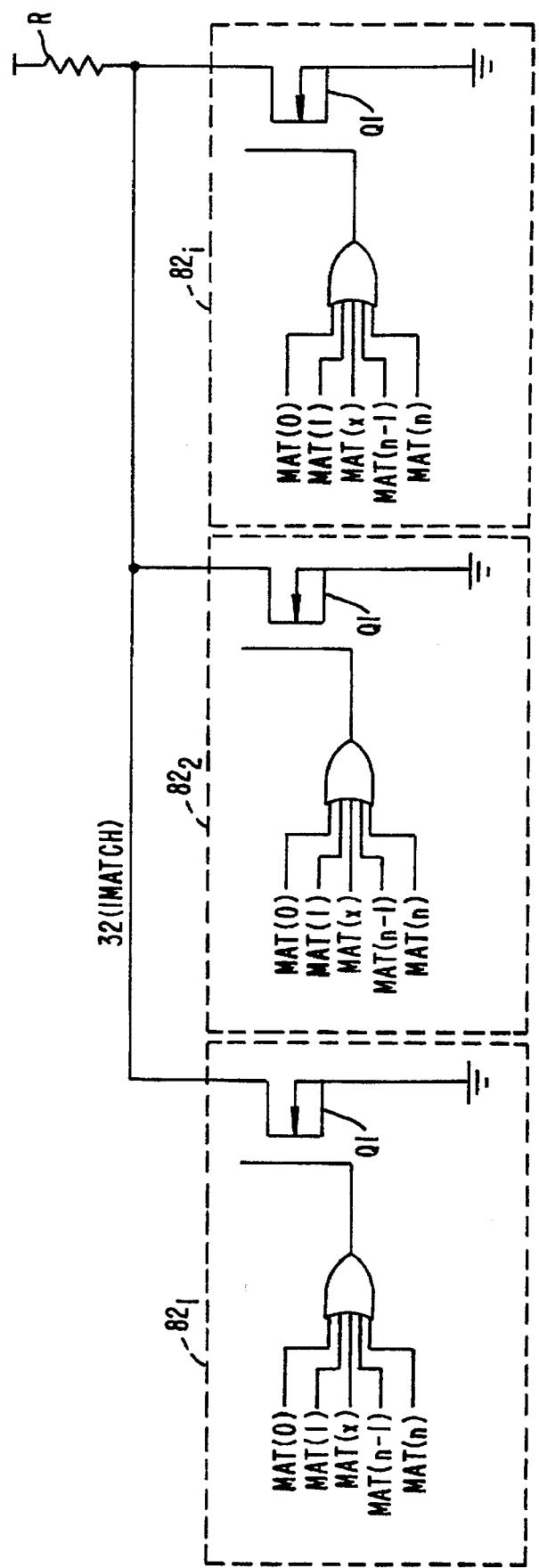
FIG. 8 is a block schematic diagram of match detector 82 shown in FIG. 5.

The signals from address compare circuit 65, shift register, and enable register bank go to the disrupt controller 70$_x$. FIG. 7 illustrates a preferred embodiment of disrupt controller 70$_x$. There is one disrupt controller 70$_x$ for each port. MAT(p) indicates the DA matches any of the enabled AAs, LSA(p), and PSA(p). All the MAT(p) are ORed to enable the open drain driver to assert the MATCH signal as shown in FIG. 8. DISRUPT SELECT(x) goes to MUX 80 that disrupts the output of port x (not shown). When DISRUPT SELECT(x) is high, the disrupt is enabled.

Disrupter 75$_x$ provides modified data to output port 90$_x$ in place of DATA whenever port 90$_x$ is not to retransmit DATA, i.e., the data packet disrupting feature is activated. As implemented, disrupter 75$_x$ outputs alternating "1's" and "0's" by implementing a simple multivibrator. In the preferred embodiment, disrupter 75$_x$ has an input of a flip-flop coupled to output port 90$_x$, and an inverter coupled to an output of the flip-flop. The output of the inverter is the output of disrupter 75$_x$.

Multiplexer 80$_x$ includes two inputs, a "0" input coupled to the output of disrupter 75$_x$ and a "1" input coupled to DATA from repeater front-end 50. Multiplexer 80$_x$ is responsive to DISRUPT SELECT(x) provided at a SELECT input to route one of the inputs to output port 90$_x$. When DISRUPT SELECT(x) is driven HIGH, multiplexer 80$_x$ routes modified data from disrupter 75$_x$ to output port 90$_x$. When DISRUPT SELECT(x) is driven HIGH, multiplexer 80$_x$ routes DATA to output port 90$_x$.

Register bank 76 includes a plurality of memory locations (not shown) for providing enable signals corresponding to various one of the disruption control condition signals, such as whether to disrupt on assertion of the BROADCAST signal, the MULTICAST signal, the ADDR_2 signal, etc.

In the preferred embodiment, there are enable signals associated with each port for enabling security for a port (an ENA signal), for enabling non-disruption on a match with a PSA (a PSAE signal), for enabling non-disruption on a match with a LSA (a LSAE signal), for enabling non-disruption on a match with any AA (an AAEx signal), for enabling non-disruption on a detection of a multicast address (a MULT signal), for enabling non-disruption on detecting no match between a PSA, LSA, or AAx signal associated with a particular port (an NMAT signal), and for enabling non-disruption for a delayed period until ADDR_2 has been transmitted non-disrupted from a particular port.

One preferred embodiment generates each enabling signal based upon a value of a bit in an enabling word associated with the particular enabling condition. This enabling word has a number of bit positions equal to the number of ports, with particular bit positions mapped to and corresponding with a particular port. In other words, for a sixteen (16) port implementation, each enabling word is 16 bits long. Bit position 0 preferably corresponds to port 0, bit position 1 with port 1, etc. Security features for disrupt controller 70x thus are controllable on a per-port basis.

The enable values in register bank 76 are written in response to data and control signals provided by MPI 84. MPI 84 communicates with MPU 28 (shown in FIG. 4) via MP_DATA bus 34. MPI 84 reads and writes data to register bank 76 in conventional manner. For example, an enable read signal, an enable write signal, an enable data bus, and an enable address bus permit enabling words to be written to register bank 76.

Additionally, addresses are written to address compare circuit 65 by use of signals and data from MPI 84. For example, these signals may include a read signal, a write signal, a plurality of data signals and a plurality of address signals. Reading, and writing to a memory array is conventional and will not be further described, nor will the construction and operation of conventional memory cells used in such arrays.

Match detector 82 operates to indicate to any discrete repeater package 25 interconnected as a single logical repeater whether any of the addresses stored in address compare circuit 65 correspond to an incoming destination address at a port having address comparison activated for the address. Each disrupt controller 70x determines a state for a MAT(x) signal depending upon a result of logical product of an address compare signal (such as PSAC(x), LSAC(x), or any AACi(x)) and its associated enable signal. If any of the address compare signals are asserted when the particular signal has been enabled for that port, disrupt controller 70x asserts MAT(x). Match detector 82 receives all of the MAT(x) signals for each port, as well as the !MATCH signal from no_match bus 32 shown in FIG. 8, and asserts !MATCH if any MAT(x) signal is asserted. Any assertion of a MAT(x) in any discrete repeater package 25 is detected by match detectors 82 in other discrete repeater packages 25. Match detector 25 also provides the !MATCH signal to each disrupt controller 70x for use in controlling the DISRUPT SELECT(x) signal.

In operation, repeater front-end 50 receives a data packet at one of its input ports $85_i$. Repeater front-end 50 drives DATA with the serial bits contained in the data packet and asserts ENABLE when DATA is valid. Forty-eight bits immediately following the start of frame delimiter make up the destination address field.

At a beginning of a packet, both $ADDR_{13}1$ and ADDR_2 are asserted and controller 55 counts the incoming bits of DATA. SHIFT_ENABLE is asserted until the destination address is shifted into shift register 60, at which point shift register 60 is locked by deasserting SHIFT_ENABLE. Controller 55 deasserts ADDR_1, after a predetermined delay, once the desired field (e.g., destination address) has been locked into shift register 60. Controller 55 asserts ADDR_2 until a second field (e.g., source address) has been driven on the DATA output line. Controller 55 asserts COMPARE after deasserting SHIFT_ENABLE and locking the destination address into shift register 60.

Assertion of COMPARE causes address compare circuit 65 to compare the destination address, locked in shift register 60, to each of a plurality of stored addresses. These stored addresses correspond to various ones of the associated end user stations 15 (shown in FIG. 3) coupled to output ports 90 of secure repeater 20. In other words, a particular end user station $15_x$, having an address $ADDRESS_x$, that is coupled to output port $90_x$, has $ADDRESS_x$ stored in a particular memory of compare circuit 65 that is associated with PORT $90_x$. When the destination address stored in shift register 60 is compared with all the stored addresses, one or more address compare signals are asserted when a match is found. PSAC(x) and/or LSAC(x) is asserted for each port $90_x$ having a matching associated stored address, or one of the (x) signals.

A delay disrupt controller $70_x$ receives the ADDR_1 signal, the ADDR_2 signal, BROADCAST and MULTI-CAST signals, enable signals and !MATCH signals, the PSAC(x) and LSAC(x) signals, and all the (x) signals. As described above, depending upon how disrupt controller 70x is configured, disrupt controller $70_x$ drives DISRUPT SELECT(x) HIGH or LOW depending upon the various signals, thereby routing DATA or MODIFIED DATA, respectively, to output port $90_x$. Disrupt controller $70_x$ is easily configurable to meet the specific security conditions identified in the incorporated patent applications.

Disrupt controller $70_x$ satisfies the logic equation shown above and asserts DISRUPT SELECT(x) HIGH or LOW depending upon the values of the input signals.

Figure 6:
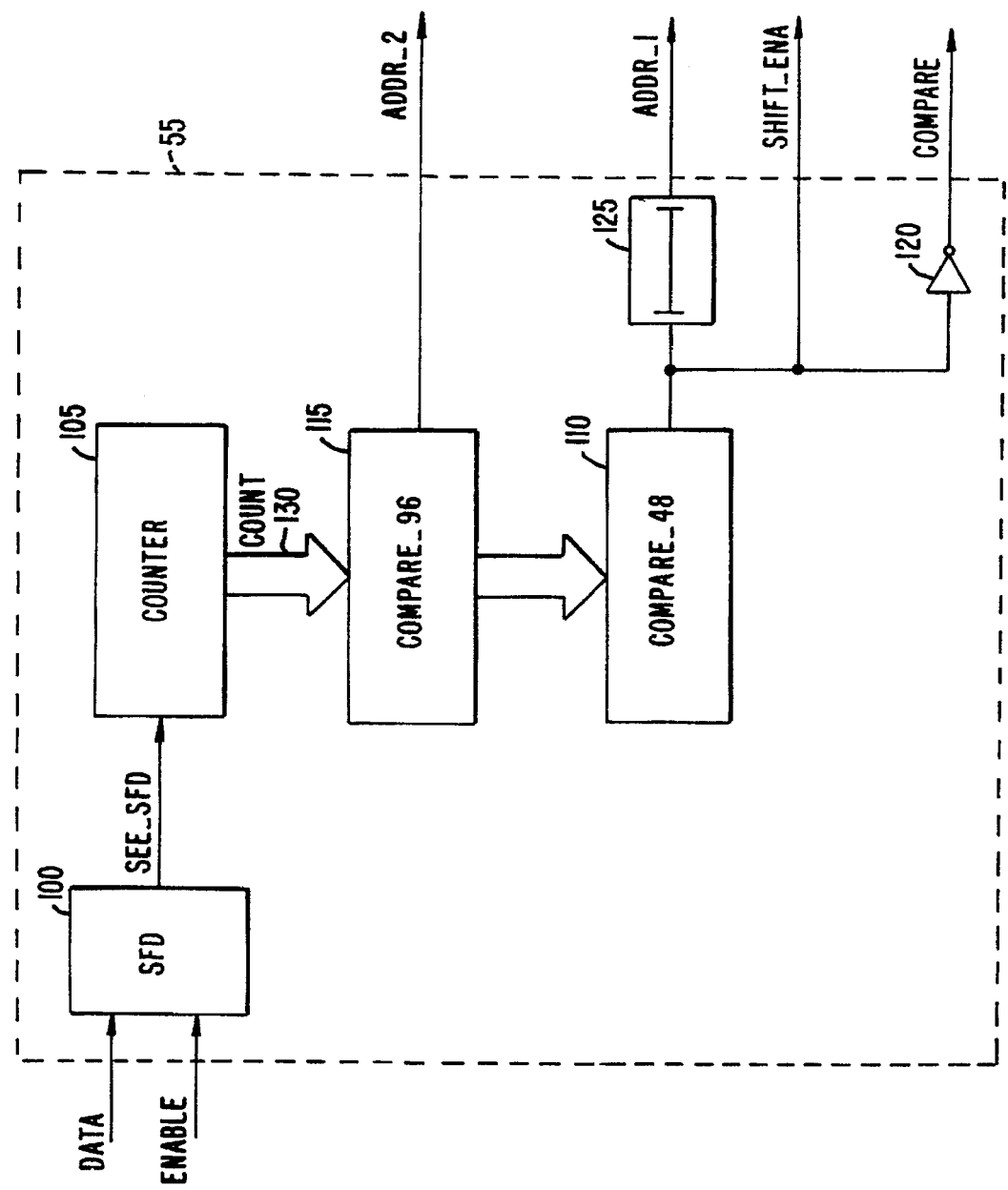
FIG. 6 is a detailed block diagram of a controller used in the secure repeater shown in FIG. 5.

FIG. 6 is a detailed block diagram of controller 55 shown in FIG. 5. Controller 55 includes a start frame detector (SFD) 100, a counter 105, a first compare circuit 110, a second compare circuit 115, an inverter 120, and a delay element 125. The DATA and ENABLE signals are input into SFD 100. SFD 100 monitors DATA for the start of frame delimiter. After the start of frame delimiter is detected, SFD 100 asserts a SEE_SFD signal. The SEE_SFD signal is asserted after the SFD is detected and remains asserted as long as ENABLE remains asserted.

Counter 105 is coupled to SFD 100 and is responsive to the SEE_SFD signal to increment a total count once per bit time. Thus, counter 105 counts each bit of DATA after the start of frame delimiter. The total count of counter 105 is output on output lines making up count bus 130.

First compare circuit 110 and second compare circuit 115 are coupled to count bus 130 and each monitors the total count of counter 105. Initially, SHIFT_ENABLE is HIGH. When counter 105 counts to forty-eight (48), first compare circuit 110 deasserts the SHIFT_ENABLE signal LOW. An input of inverter 120 is coupled to the output of compare circuit 110. An output of inverter 120 drives the COMPARE signal. An input of delay element 125 is also coupled to the output of first compare circuit 110. An output of delay element 125 is the ADDR_1 signal. An amount of delay set by delay element 125 allows for the compare procedure to complete and an address comparison signal to be asserted before changing state. Controller 55, in the preferred embodiment, asserts SHIFT_ENABLE and ADDR_1 until counter 105 counts to sufficient incoming bits to receive the desired first field, which in the case of the destination address, is forty-eight.

When counter 105 counts ninety-six (96) bits (for ADDR_2 corresponding to the source address) after the SFD, second compare circuit 115 deasserts ADDR_2 for enabling non-disruption on a match with an address comparison signal (e.g., a PSAC(x) signal). ADDR_2 is initially HIGH, and transitions LOW after the desired second field has been transmitted in the DATA signal. While the preferred embodiment uses the destination address fields and the source address fields, by adjusting the counters, for example, it would be possible to select other fields. For example, in an alternate implementation, it may be desirable to always pass the DA and SA, but selectively delay the data field. Appropriate adjustment of the counter compare values could implement the alternate embodiment simply.

FIG. 7 is block diagram illustrating a preferred functional embodiment for disrupt controller 70x. Disrupt controller 70 includes a number of address comparison dual-input AND gates F equal in number to a sum of AAC output lines (Y) plus the number of fixed address lines (here two, one for LSA and the other for PSA). Thus, there are Y+2 (Y=32 in the preferred embodiment) address comparison AND gates F for each disrupt controller 70x according to the preferred embodiment. Each AND gate F receives an address comparison signal (e.g., a LSAC(x))at one input and an associated enable signal (e.g., LSAE(x)) at the other input. The outputs of address comparison AND gates F are input into a MAT(X) OR gate G1 having Y+2 inputs. The output of MAT(x) OR gate G1 is the MAT(x) signal provided to match detector 82 shown in FIG. 5, as well as to one input of a disrupt NOR gate G2.

Disrupt NOR gate G2 has a number of inputs equal to the security conditions monitored by discrete repeater package 25, in the preferred embodiment there are seven inputs for disrupt NOR gate G2. An output of disrupt NOR gate G2 is the DISRUPT SELECT(x) signal provided to multiplexer 80x.

Regarding the input conditions, as discussed above, MAT (x) is provided at a first input of disrupt NOR gate G2. The BROADCAST signal from AND gate 78 shown in FIG. 5 is input into a second input of NOR gate G2. A dual input multicast AND gate G3 receives the MULTICAST signal at one input and the multicast enable signal for port x (MULT (x)) at another input. An output of AND gate G3 is provided to a third input of NOR gate G2. ADDR_1 is provided to a fourth input of NOR gate G2.

A dual input match AND gate G4 receives the !MATCH signal from match detector 82 shown in FIG. 5 at one input and a no match enable signal for port x (NMAT(x)) at another input. An output of AND gate G4 is provided to a fifth input of NOR gate G2. An inverter G5 receives a security enable signal for port x (ENA(x)). An output of inverter G5 is coupled to a sixth input of NOR gate G2. A dual input delay AND gate G6 receives ADDR_2 from controller 55 shown in FIG. 5 at one input, and a delay enable signal for port x at a second input (DLY(x)). An output of AND gate G6 is provided to the seventh input of NOR gate G2.

In operation, disrupt NOR gate G2 asserts DISRUPT SELECT(x) unless one of the seven inputs is asserted. Assertion of DISRUPT SELECT(x) causes multiplexer 80x to output disrupted data. Assertion of one or more inputs of NOR gate G2 deasserts DISRUPT SELECT(x), thereby transmitting the data packet unmodified.

FIG. 8 is a block schematic diagram of three match detectors 82 shown in FIG. 5. Match detector 82 includes a multi-input OR gate G10, having one input per port in the preferred embodiment, for receiving the MAT(x) signals, x=1 to n−1. The output of OR gate G10 is coupled to a gate of an n-channel MOSFET Q1 coupled between a reference voltage (e.g., ground) and the !MATCH data bus 32. Without any of the MAT(x) signals asserted, MOSFET Q1 is off, and !MATCH is HIGH. Assertion of any MAT(x) of any repeater package 25 turns MOSFET Q1 of the appropriate match detector 82 on, deasserting !MATCH (LOW). The !MATCH signal is also provided to disrupt controller 70x.

Figure 9:
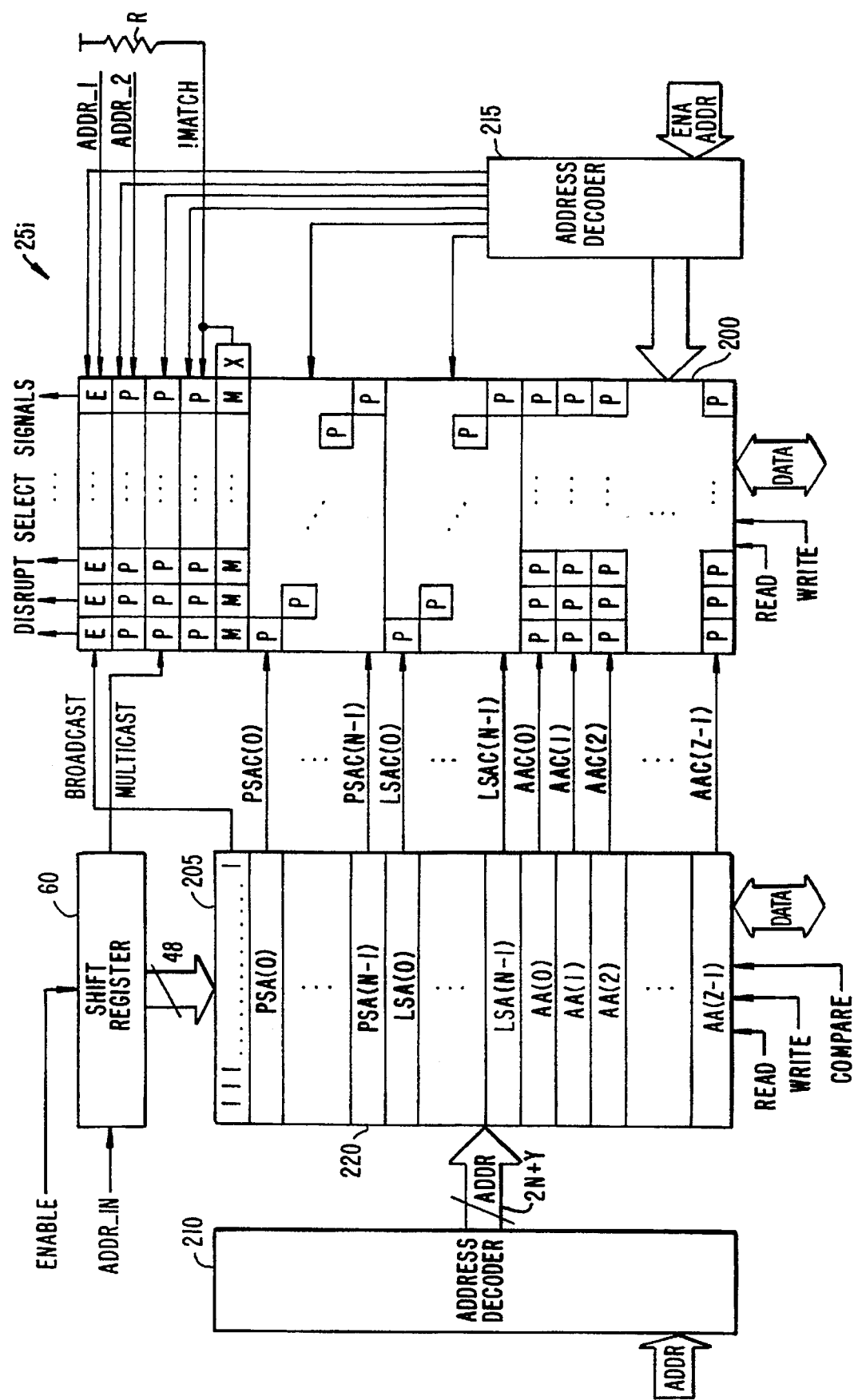
FIG. 9 is a diagrammatic representation of implementation of the register bank, the disrupt controller, and the match detector in a simple cell array.

FIG. 9 is a diagrammatic representation of a preferred implementation of repeater package 25 implementing register bank 76, disrupt controller 70$_x$ for all ports, and match detector 82 into a simple cell array 200. Repeater package 25 also includes a shift register 60, an address storage matrix 205, a first address decoder 210 and a second address decoder 215. For completeness, external resistor R shown in FIG. 4 and FIG. 8 is also shown in FIG. 9. Address storage matrix 205 and address decoder 210 together provide address comparison circuit 65 shown in FIG. 5.

In this representative preferred embodiment, address storage matrix 205 includes a number of registers 220 that equal twice the number of ports plus the total number of alternate address storage locations, plus one additional register 220. Address storage matrix 205 includes sixty-five registers 220 for a sixteen (16) port repeater having thirty-two alternate address storage locations. Thus, there is a register 220 for each PSA(p), and for each LSA(p) for each port p, as well as a register for each alternate address storage location AA(Y). Because the address to be compared from shift register 60 is a forty-eight bit address, each register 220 is a forty-eight bit register in the preferred embodiment. An additional register is hardwired to store an equivalent of all "1's" to correspond to a broadcast address. This register with hardwired 1's is functionally equivalent to AND gate 78 shown in FIG. 5.

Cell array 200, combined with address decoder 215 implements the functions of the disrupt controllers, register bank and match detector. Cell array 200 includes a plurality of different types of cells; a programmable cell (P), an enable cell (E), a match cell (M), and extra cell (X). Details regarding each cell is further described with respect to FIG. 10.

Each E cell contains one ENA register for enabling/disabling security for a particular port. Each P cell includes a programmable register (preferably a single bit) used to control enablement of various disrupt conditions, such as DLY, MULT, NMAT, PSAE, LSAE, and AAE registers.

This architecture is easily and efficiently scaleable. Each column of cell array 200 corresponds to one port. An entire row of P cells are used for each alternate address register 220, with the number of assignable address storage registers varying from zero and greater.

One P cell is used for each LSA or PSA register 220, because as described earlier, LSA and PSA registers 220 are fixed to correspond to a single port. Fixing the correspondence of a register 220 to a particular port results in diagonal arrangement of P cells corresponding to the comparison condition for each port. Again, when PSA and LSA fixed addresses are not implemented, the P cells corresponding to these registers may be eliminated. It is possible to add additional sets of diagonally arranged P cells if the number of fixed addresses increases, and it is not necessary to provide each port with the same number of fixed addresses.

One entire row of P cells, one row of M cells and one X cell are used to implement the inverse non-match disrupt function, or similar type of condition merging disrupt information from multiple discrete repeater packages 25. For embodiments not including the inverse non-match disrupt function, or similar function, these rows may be eliminated.

A row of P cells implement the programmable non-disrupt on multicast packet function, and one row implements programmable delay of disrupt function. Either or both of these rows may be eliminated if the corresponding function is not used.

One row of E cells implements the basic enable/disable non disrupt on BROADCAST address, as well as non disrupt on while the first field (destination address) is transmitting. Configuration of an E cell is customizable depending upon the particular functions implemented.

By using the disclosed embodiment, it is a simple proposition to add additional qualifying conditions, or to modify qualifying conditions. A qualifying condition refers to, for example, AAC(0), PSAC(3), ADDR_2, and BROADCAST signals. Adding a row of P cells below the row of M cells includes the qualifying condition in the determination of assertion of MATCH. Adding a row of P cells above the row of M cells adds the corresponding qualification condition without including it in the MATCH determination.

Figure 10:
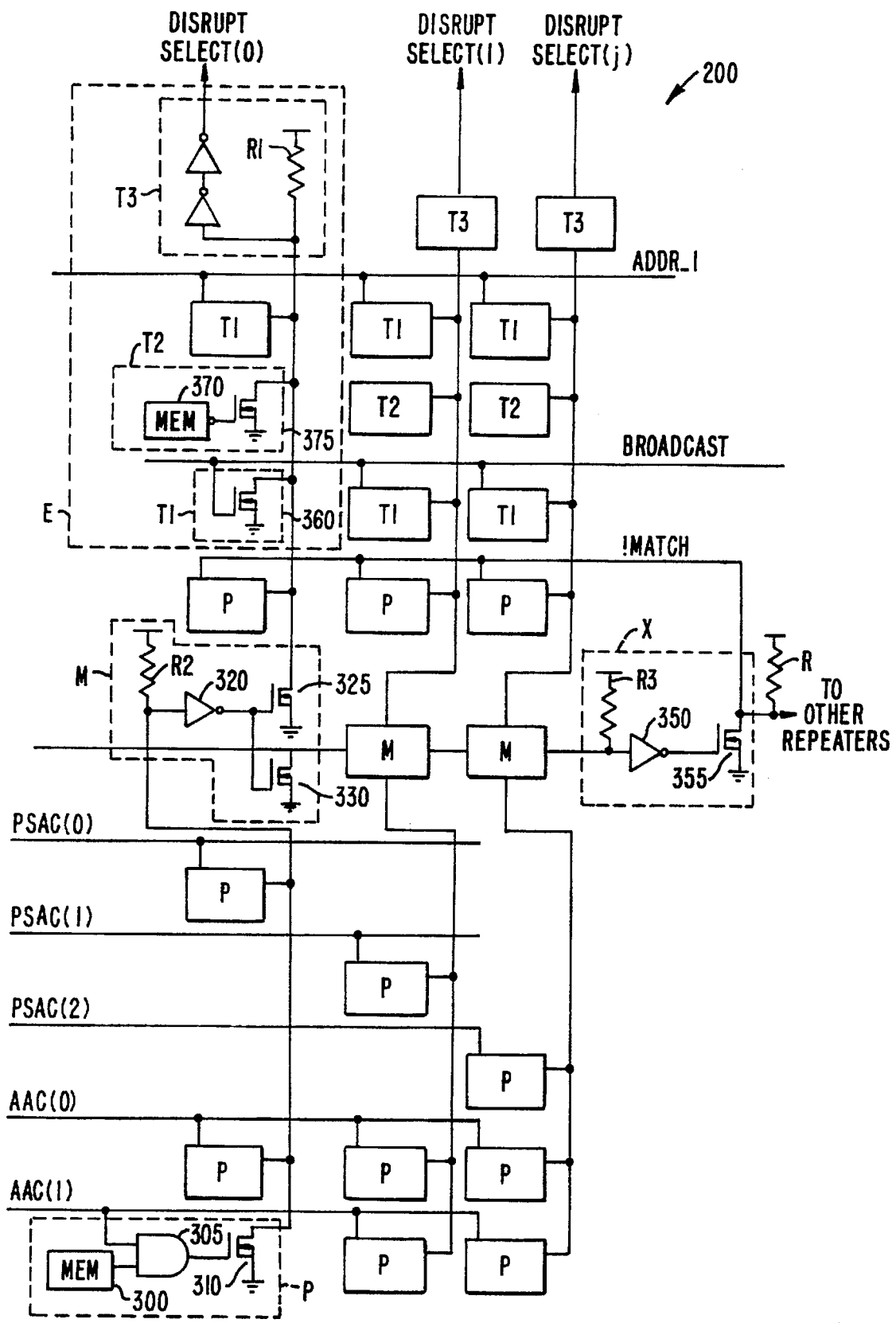
FIG. 10 is detailed layout diagram of the cell array shown in FIG. 9.

FIG. 10 is detailed layout diagram of cell array 200 shown in FIG. 9. Configuring cell array 200 as illustrated in FIG. 9 and FIG. 10 permits simple construction of a customizable cell array by simple abutment of selected cell types. In FIG. 10, connectivity to access, read and write the memory (MEM) storage locations is not shown as this aspect of the preferred embodiment of the present invention makes use of well known RAM cell technology. Other configurations may implement the MEM locations in different fashion.

Cell array 200 shown in FIG. 10 is implemented for a 3 port repeater having 2 alternate address comparison signals (AA(0) and AA(1)), one (1) fixed address comparison address (PSAC(x)) per port, and responsive to 3 general qualification signals: ADDR_1, BROADCAST, and !MATCH, and including an ENA-type feature.

In the preferred embodiment, P cell includes enable register 300, a dual input AND gate 305 and an n-channel MOSFET 310. One input of AND gate 305 receives an output from enable register 300 and the other input of AND gate 305 is coupled to receive the qualification signal, such as for example AAC(1). An output of AND gate 305 is coupled to a gate of MOSFET 310. A source of MOSFET 310 is coupled to a first reference voltage with a drain terminal coupled to a column line corresponding to a particular port. The column line is coupled, directly or indirectly, through an M cell, to one terminal of a resistor R1. A second terminal of resistor R1 is coupled to a second reference voltage, (Vdd).

M cells of the preferred embodiment include an inverter 320, two n-channel MOSFETs (325 and 330), and a resistor R2. Resistor R2 has one terminal coupled to the second reference voltage and a second terminal coupled to an input of inverter 320. Also coupled to the input of inverter 320 are the drain terminals of MOSFET 310 of the P cells that are both in the same column as the M cell and below the M cell. An output of inverter 320 is coupled to a gate of MOSFET 325 having a drain coupled to R1 and a source coupled to the first reference voltage level. The output of inverter 320 is also coupled to a gate of MOSFET 330 having its source coupled to the first reference voltage. The drains of MOSFETs 330 of each M cell are coupled to a row line that is coupled to the X cell.

The X cell includes a resistor R3, an inverter 350, and an n-channel MOSFET 355. One terminal of resistor R3 is coupled to the second reference voltage and a second terminal of resistor R3 is coupled to an input of inverter 350. An output of inverter 350 is coupled to a gate of MOSFET 355. A source of MOSFET 355 is coupled to the first reference voltage level. A drain of MOSFET 355 is coupled to the external resistor R and to other X cells of other discrete repeater packages in order to provide the !MATCH signal. Note that the !MATCH signal is also used as a qualifying condition signal provided to a row of P cells above the row of M cells.

In actual implementations, there may be more P cells above the row of M cells than those shown, depending upon particular configurations. The row of cells at the top are E cells. An E cell may include a number of different types of enabling sub-cells (Type 1 (T1), Type 2 (T2) or Type 3 (T3), for example), depending upon the type of qualifying condition to be enabled. For example, T1 sub-cells have an n-channel MOSFET 360 having a gate coupled to receive the qualifying signal, a source coupled to the first reference voltage and a drain coupled to resistor R1 at the top of the column line. If the qualifying condition exists, as indicated by an assertion of the corresponding signal, disruption for the particular port having a T1 sub-cell is turned off.

A T2 sub-cell has an enable register 370 with an inverted output coupled to a gate of an n-channel MOSFET 375. A source of MOSFET 375 is coupled to the first reference voltage and a drain is coupled to R1. There is no qualifying condition signal associated with a T2 sub-cell as control of MOSFET 375 is controlled exclusively by the value stored in enable register 370. In the preferred embodiment, the T2 sub-cell is used to select which ports are to have security features activated. In other words, by storing a low value in enable register 370, i.e., disabling security for the particular column, the port will never disable data packets from the relevant port and transmit every packet undisrupted and in its entirety.

The T3 sub-cell includes resistor R1 having a first terminal coupled to the various outputs of the sub-cells, P cells, and M cells in any column. A second terminal of resistor R1 is coupled to the second voltage reference level. Also coupled to the first terminal of resistor R1 and included in the T3 sub-cell, is a pair of series coupled inverters. The output of the pair of inverters is a disrupt select signal for the particular column, i.e., port.

In operation, no assertion of a signal at the gates of any of the MOSFETs in the cells and sub-cells coupled to the first terminal of resistor R1 cause resistor R1 to pull to a high level the input voltage provided to an input of the pair of inverters of the T3 sub-cell high. This high level results in assertion of the DISRUPT SELECT signal corresponding to the port corresponding to the particular column. However, should any of the qualifying conditions exist, the input voltage is pulled low, deasserting the DISRUPT SELECT signal.

As described, secure repeater 20 provides for selective and programmable, on a per port basis, disrupt response for a data packet. Some or all ports can be disabled from the disrupt response, allowing controllable, secure retransmission from ports. A repeater formed by combination of two or more discrete repeater packages has expandable and interrelated security features. A simplified layout for formation of a cell array to permit simple, efficient scaling and extension to a secure repeater.

In conclusion, the present invention provides a simple, efficient solution to selective response of a secure repeater to a data packet. While the above is a complete description of the preferred embodiments of the invention, various alternatives, modifications, and equivalents may be used. Therefore, the above description should not be taken as limiting the scope of the invention which is defined by the appended claims.

What is claimed is:

1. In a secure repeater used in a network for connecting a plurality of end stations, a packet security method comprising the steps of:

receiving a packet from a first end station wherein said packet includes a destination address; thereafter extracting said destination address from said packet; thereafter comparing said destination address to each of a plurality of stored addresses, one of said plurality stored addresses associated with two or more ports of the repeater; and thereafter disrupting a retransmission of said packet from a first one of the ports of the repeater when said destination address does not match any stored address associated with said first port.

2. The packet security method of claim 1, further comprising the step of:

disrupting a retransmission of said packet from a second one of the ports of the repeater when said destination address does not match any stored address associated with said second port.

3. The packet security method of claim 2 wherein said disrupting step for said first port is inhibited until after said destination address is retransmitted from said first port and wherein said disrupting step for said second port is inhibited until after said destination address is retransmitted from said second port.

4. The packet security method of claim 2 wherein a particular stored address is associated with said first port and with said second port and wherein said packet is retransmitted undisrupted from both said first port and said second port when said destination address matches said particular stored address.

5. The packet security method of claim 2 further comprising the steps of:

associating, prior to said comparing step, a first fixed address register with said first port for storing a first associated address;

associating, prior to said comparing step, a second fixed address register with said second port for storing a second associated address; and assigning, dynamically, a first assignable address register from a pool of assignable address registers to said first port to associate an address stored in said first assignable address register with said first port.

6. The packet security method of claim 1, further comprising the steps of:

determining whether said destination address identifies said packet as a special packet; and thereafter inhibiting said disrupting step when said packet is said special packet so the repeater retransmits said packet from said first port when said destination address does not match any stored address associated with said first port.

7. The packet security method of claim 1 further comprising the steps of:

determining whether said destination address matches any stored address associated with any port of the repeater; and thereafter inhibiting said disrupting step for a selected port when said destination address does not match any stored address associated with any port.

8. The packet security method of claim 1 wherein said disrupting step for said first port is inhibited until after said destination address is retransmitted from said first port.

9. The packet security method of claim 1 wherein the repeater includes a first discrete repeater coupled to a second discrete repeater by an expansion bus to form a single logical repeater and wherein the method further comprises the steps of:

determining, for said first discrete repeater, whether said destination address matches any stored address associated with any port of said first discrete repeater; and thereafter receiving a match signal from said second discrete repeater indicating whether a match exists between a received destination address at said second discrete repeater and any stored address associated with a port of said second discrete repeater; and thereafter inhibiting said disrupting step for a selected port of said first discrete repeater when said destination address does not match any stored address associated with any port of said first discrete repeater and said match signal indicates no match of said received destination address and any stored address of said second discrete repeater.

10. The packet security method of claim 1 wherein the repeater includes a first discrete repeater coupled to a second discrete repeater by an expansion bus to form a single logical repeater and wherein the method further comprises the steps of:

determining, for said first discrete repeater, whether said destination address matches any stored address associated with any port of a plurality of selected match ports of said first repeater; and thereafter receiving a match signal from said second discrete repeater indicating whether a match exists between a received destination address at said second discrete repeater and any stored address associated with a match-enabled port of said second discrete repeater; and thereafter inhibiting said disrupting step for a selected port of said first discrete repeater when said destination address does not match any stored address associated with any match port of said first discrete repeater and said match signal indicates no match of said received destination address and any stored address of said second discrete repeater that is associated with any match-enabled port.

11. The packet security method of claim 1 further comprising the step of:

inhibiting said disrupting step for said first port, responsive to a first security enable register, when said first security enable register indicates security for said first port is disabled to retransmit said packet from said first port from the repeater without regard to a result of said comparing step.

12. A disrupt circuit used in a secure repeater for independently controlling retransmission of a packet from a plurality of ports of the repeater in response to a plurality of disrupt condition signals, comprising:

an array of standardized disrupt cells having a plurality of columns corresponding to the plurality of ports, one column for each port and a plurality of rows corresponding to the plurality of condition signals, one row for each disrupt condition signal, wherein any particular row is made up of disrupt cells of one type corresponding to a type of condition signal, wherein an additional condition may be added by addition of an additional row of standardized disrupt cells.

13. The disrupt circuit of claim 12 wherein one of the plurality of condition signals is a MATCH condition signal and wherein said standardized disrupt cells in a particular row corresponding to said match condition signal are a match type of disrupt cell and are interposed between an output side of said array and a subset of said plurality of rows of standardized disrupt cells that affect a disrupt response of said match type of disrupt cells.

14. The disrupt circuit of claim 13 wherein selectively enableable standardized disrupt cells include a memory register to enable response to said corresponding condition signal for each column.

15. A disrupt circuit used in a secure repeater for independently controlling retransmission of a packet from a plurality of ports of the repeater in response to a plurality of disrupt condition signals, comprising:

an array of standardized disrupt cells having a plurality of columns corresponding to the plurality of ports, one column for each port and a plurality of rows corresponding to the plurality of condition signals, one row for each disrupt condition signal, wherein any particular row is made up of disrupt cells of one type corresponding to a type of condition signal, wherein an additional port may be added by addition of an additional column of standardized disrupt cells.

16. The disrupt circuit of claim 15 wherein each column independently asserts a disrupt select signal having a first value when its corresponding port p is to retransmit the packet and said disrupt select signal having a second value when its corresponding port p is to retransmit a disrupted packet, wherein said disrupt select signal for the port p has said first value when:

(ENA(p) is disabled) OR (DA is a broadcast address) OR (LSAE(p) indicates enabled AND LSA(p) matches DA) OR (PSAE(p) indicates enabled AND PSA(p) matches DA) OR (AAE(n,p) indicates enabled AND AA(n) matches DA for at least one n) OR (MULT(p) indicates enabled AND DA is a multicast address) OR (NMAT(p) indicates enabled AND MATCH indicates no match) OR (ADDR_1 indicates DA has not been retransmitted from the port p) OR (DLY(p) indicates enabled AND ADDR_2 indicates a predetermined field of the packet has not been retransmitted from the port p)

where MATCH indicates a match when:
(LSAE(q) indicates enabled AND LSA(q) matches DA for at least one q) OR
(PSAE(q) indicates enabled AND PSA(q) matches DA for at least one q) OR
(AAE(n,q) indicates enabled AND AA(q) matches DA for at least one permutation of n,q).

17. A disrupt circuit used in a secure repeater for independently controlling retransmission of a packet from a port p of a plurality of ports of the repeater in response to a plurality of condition signals, comprising:

a disrupter coupled to the port p for receiving the packet and for retransmitting the packet from the port p when a disrupt select signal has a first value and for retransmitting a disrupted packet from the port p when said disrupt select has a second value; and a disrupt controller, coupled to said disrupter and responsive to the plurality of condition signals, for controlling said disrupt select signal, wherein said disrupt select signal has said first value when:

(ENA(p) is disabled) OR (DA is a broadcast address) OR (LSAE(p) indicates enabled AND LSA(p) matches DA) OR (PSAE(p) indicates enabled AND PSA(p) matches DA) OR (AAE(n,p) indicates enabled AND AA(n) matches DA for at least one n) OR (MULT(p) indicates enabled AND DA is a multicast address) OR (NMAT(p) indicates enabled AND MATCH indicates no match) OR (ADDR_1 indicates DA has not been retransmitted from the port p) OR (DLY(p) indicates enabled AND ADDR_2 indicates a predetermined field of the packet has not been retransmitted from the port p)

where MATCH indicates a match when:
(LSAE(q) indicates enabled AND LSA(q) matches DA for at least one q) OR
(PSAE(q) indicates enabled AND PSA(q) matches DA for at least one q) OR
(AAE(n,q) indicates enabled AND AA(q) matches DA for at least one permutation of n,q).

18. A disrupt circuit used in a secure repeater for independently controlling retransmission of a packet from a port p of a plurality of ports of the repeater in response to a plurality of condition signals, comprising:

a disrupter coupled to the port p for receiving the packet and for retransmitting the packet from the port p when a disrupt select signal has a first value and for retransmitting a disrupted packet from the port p when said disrupt select has a second value; and a disrupt controller, coupled to said disrupter and responsive to the plurality of condition signals, for controlling said disrupt select signal, wherein said disrupt select signal has said second value when:

(ENA(p) indicates enabled) AND (DA not indicate a broadcast address) AND (LSAE(p) indicates disabled OR LSA(p) not match DA) AND (PSAE(p) indicates disabled OR PSA(p) not match DA) AND for every pair of AAE (n,p) and associated AA(n), either (AAE(n,p) indicates disabled OR AA(n) not match DA) AND (MULT(p) indicates disabled OR DA not indicate a multicast address) AND (NMAT(p) indicates disabled OR MATCH indicates a match) AND (ADDR_1 indicates DA has been retransmitted from the port p) AND (DLY(p) indicates disabled OR ADDR_2 indicates a predetermined field of the packet has been retransmitted from the port p)

where MATCH indicates a match when:
(LSAE(q) indicates enabled AND LSA(q) matches DA for at least one q) OR
(PSAE(q) indicates enabled AND PSA(q) matches DA for at least one q) OR
(AAE(n,q) indicates enabled AND AA(q) matches DA for at least one permutation of n,q).

19. In a secure repeater used in a network for connecting a plurality of end stations, a packet security method comprising the steps of:

receiving a packet from a first end station wherein said packet includes a destination address; thereafter extracting said destination address from said packet; thereafter comparing said destination address to each of a plurality of stored addresses associated with one or more ports of the repeater; and thereafter disrupting a retransmission of said packet from a first port of the ports of the repeater when said destination address does not match any stored address associated with said first port;

disrupting a retransmission of said packet from a second port of the ports of the repeater when said destination address does not match any stored address associated with said second port;

determining whether said destination address identifies said packet as a special packet; and thereafter inhibiting said disrupting step when said packet is said special packet so the repeater retransmits said packet from said first port when said destination address does not match any stored address associated with said first port.

20. The packet security method of claim 19 wherein said first port has an associated special packet enabling memory such that said inhibiting step inhibits said disrupting step only when said associated special packet enabling memory indicates that special packet retransmission from said first port is enabled.

21. The packet security method of claim 20 wherein said special packet is a multicast packet.

22. The packet security method of claim 6 wherein said special packet is a multicast packet or a broadcast packet.

23. The packet security method of claim 19 wherein said special packet is a broadcast packet.

24. The packet security method of claim 19 wherein said special packet is a multicast packet.

25. The packet security method of claim 19 wherein said first port has an associated special packet enabling memory such that said inhibiting step inhibits said disrupting step when said associated special packet enabling memory indicates that special packet retransmission from said first port is enabled and said special packet is a first type of special packet and said inhibiting step inhibits said disrupting step when said special packet is a second type of special packet without regard to said associated special packet enabling memory.

26. The packet security method of claim 25 wherein said first type of special packet is a multicast packet and said second type of special packet is a broadcast packet.

27. In a secure repeater used in a network for connecting a plurality of end stations, a packet security method comprising the steps of:

receiving a packet from a first end station wherein said packet includes a destination address; thereafter extracting said destination address from said packet; thereafter comparing said destination address to each of a plurality of stored addresses associated with one or more ports of the repeater; and thereafter disrupting a retransmission of said packet from a first port of the ports of the repeater when said destination address does not match any stored address associated with said first port determining whether said destination address matches any stored address associated with any port of the repeater; and thereafter inhibiting said disrupting step for a selected port when said destination address does not match any stored address associated with any port.

28. The packet security method of claim 27 wherein said selected port has an associated no match enabling memory such that said inhibiting step inhibits said disrupting step only when said associated no match enabling memory indicates that packet retransmission from said selected port on no address match is enabled.

29. The packet security method of claim 27, further comprising the steps of:

determining whether said destination address identifies said packet as a special packet; and thereafter inhibiting said disrupting step when said packet is said special packet so the repeater retransmits said packet from said selected port when said destination address does not match any stored address associated with said selected port.

30. The packet security method of claim 29 wherein said selected port has an associated special packet enabling memory such that said special packet inhibiting step inhibits said disrupting step only when said associated special packet enabling memory indicates that special packet retransmission from said selected port is enabled.

31. In a secure repeater used in a network for connecting a plurality of end stations, a packet security method comprising the steps of:

receiving a packet from a first end station wherein said packet includes a destination address; thereafter extracting said destination address from said packet; thereafter comparing said destination address to each of a plurality of stored addresses associated with one or more ports of the repeater; and thereafter disrupting a retransmission of said packet from a first port of the ports of the repeater when said destination address does not match any stored address associated with said first port wherein said disrupting step for said first port is inhibited until after said destination address is retransmitted from said first port.

32. The packet security method of claim 31 wherein said packet includes a data field in addition to said destination address and further comprises the steps of:

inhibiting said disrupting step until after said first port retransmits said packet through said data field undisrupted so the repeater retransmits undisrupted said destination address and said data field from said first port when said destination address does not match any stored address associated with said first port; and thereafter re-enabling said disrupting of said packet after undisrupted retransmission of said destination address and said data field when said destination address does not match any stored address associated with said first port and said second port.

33. The packet security method of claim 32 further comprising the step of:

determining, prior to said inhibiting step, whether a data field delay memory associated with said first port indicates enablement of a disruption delay for said first port, wherein said inhibiting step inhibits said disrupting step only when said data field delay memory indicates enablement of a disruption delay for said first port.

34. The packet security method of claim 32 wherein said data field is a source address.

35. The packet security method of claim 32 wherein said data field includes multiple parts of said packet.

36. The packet security method of claim 35 wherein said multiple parts include a non-contiguous parts of said packet.

37. In a secure repeater used in a network for connecting a plurality of end stations, a packet security method comprising the steps of:

receiving a packet from a first end station wherein said packet includes a destination address; thereafter extracting said destination address from said packet; thereafter comparing said destination address to each of a plurality of stored addresses associated with one or more ports of the repeater; and thereafter disrupting a retransmission of said packet from a first port of the ports of the repeater when said destination address does not match any stored address associated with said first port, wherein said disrupting step for said first port is inhibited until after said destination address is retransmitted from said first port; and disrupting a retransmission of said packet from a second port of the ports of the repeater when said destination address does not match any stored address associated with said second port, wherein said disrupting step for said second port is inhibited until after said destination address is retransmitted from said second port.

38. In a secure repeater used in a network for connecting a plurality of end stations, a packet security method comprising the steps of:

receiving a packet from a first end station wherein said packet includes a destination address; thereafter extracting said destination address from said packet; thereafter comparing said destination address to each of a plurality of stored addresses associated with one or more ports of the repeater; and thereafter disrupting a retransmission of said packet from a first port of the ports of the repeater when said destination address does not match any stored address associated with said first port disrupting a retransmission of said packet from a second port of the ports of the repeater when said destination address does not match any stored address associated with said second port, wherein a particular stored address is associated with said first port and with said second port, and wherein said packet is retransmitted undisrupted from both said first port and said second port when said destination address matches said particular stored address.

39. In a secure repeater used in a network for connecting a plurality of end stations, a packet security method comprising the steps of:

receiving a packet from a first end station wherein said packet includes a destination address; thereafter extracting said destination address from said packet; thereafter comparing said destination address to each of a plurality of stored addresses associated with one or more ports of the repeater; and thereafter disrupting a retransmission of said packet from a first port of the ports of the repeater when said destination address does not match any stored address associated with said first port;

disrupting a retransmission of said packet from a second port of the ports of the repeater when said destination address does not match any stored address associated with said second port;

associating, prior to said comparing step, a first fixed address register with said first port for storing a first associated address;

associating, prior to said comparing step, a second fixed address register with said second port for storing a second associated address; and assigning, dynamically, a first assignable address register from a pool of assignable address registers to said first port to associate an address stored in said first assignable address register with said first port.

40. The packet security method of claim 39 further comprising the step of:

assigning, dynamically, a second assignable address register from a pool of assignable address registers to said second port to associate an address stored in said second assignable address register with said second port.

41. The packet security method of claim 39 further comprising the step of:

assigning, dynamically, a second assignable address register from a pool of assignable address registers to said first port to associate a second address stored in said second assignable address register with said first port.

42. The packet security method of claim 39 further comprising the step of:

assigning, dynamically, said first assignable address register to said second port to associate said address stored in said first assignable address register with both said first port and with said second port.

43. In a secure repeater used in a network for connecting a plurality of end stations wherein the secure repeater includes a first discrete repeater coupled to a second discrete repeater by an expansion bus to form a single logical repeater, a packet security method comprising the steps of:

receiving a packet from a first end station wherein said packet includes a destination address; thereafter extracting said destination address from said packet; thereafter comparing said destination address to each of a plurality of stored addresses associated with one or more ports of the repeater; and thereafter disrupting a retransmission of said packet from a first port of the ports of the repeater when said destination address does not match any stored address associated with said first port; and wherein the method further comprises the steps of:

determining, for the first discrete repeater, whether said destination address matches any stored address associated with any port of the first discrete repeater; and thereafter receiving a match signal from the second discrete repeater indicating whether a match exists between a received destination address at the second discrete repeater and any stored address associated with a port of the second discrete repeater; and thereafter inhibiting said disrupting step for a selected port of the first discrete repeater when said destination address does not match any stored address associated with any port of the first discrete repeater and said match signal indicates no match of said received destination address and any stored address of the second discrete repeater.

44. The packet security method of claim 43 further comprising the steps of:

determining, prior to said inhibiting step, when said match signal from said second discrete repeater indicates a match of a said received destination address and any stored address of said second discrete repeater; and permitting said disrupting step for a selected port of said first discrete repeater when said match signal indicates a match and said destination address does not match any stored address associated with any port of said first discrete repeater.

45. The packet security method of claim 43 wherein said first discrete repeater asserts said match signal to said second discrete repeater after detecting a match between said destination address and an address associated with a port of said first discrete repeater.

46. The packet security method of claim 43 wherein said first discrete repeater includes a !MATCH enable register, further comprising the steps of:

determining, prior to said inhibiting step, whether said !MATCH enable register enables disrupt inhibition upon no match; and thereafter permitting said disrupting step for a selected port of said first discrete repeater when said destination address does not match any stored address associated with any port of said first discrete repeater and said match signal indicates no match of said received destination address and any stored address of said second discrete repeater when said !MATCH enable register does not enable disrupt inhibition.

47. In a secure repeater used in a network for connecting a plurality of end stations wherein the repeater includes a first discrete repeater coupled to a second discrete repeater by an expansion bus to form a single logical repeater, a packet security method comprising the steps of:

receiving a packet from a first end station wherein said packet includes a destination address; thereafter extracting said destination address from said packet; thereafter comparing said destination address to each of a plurality of stored addresses associated with one or more ports of the repeater; and thereafter disrupting a retransmission of said packet from a first port of the ports of the repeater when said destination address does not match any stored address associated with said first port; and wherein the method further comprises the steps of:

determining, for the first discrete repeater, whether said destination address matches any stored address associated with any port of a plurality of selected match-enabled ports of the first repeater; and thereafter receiving a match signal from the second discrete repeater indicating whether a match exists between a received destination address at the second discrete repeater and any stored address associated with a match-enabled port of the second discrete repeater; and thereafter inhibiting said disrupting step for a selected port of the first discrete repeater when said destination address does not match any stored address associated with any match-enabled port of the first discrete repeater and said match signal indicates no match of said received destination address and any stored address of the second discrete repeater that is associated with any match-enabled port.

48. The packet security method of claim 47 wherein each port of said first and second discrete repeater includes an associated match register and said selected ports and said match-enabled ports are identified by values stored in said associated match registers.

49. In a secure repeater used in a network for connecting a plurality of end stations, a packet security method comprising the steps of:

receiving a packet from a first end station wherein said packet includes a destination address; thereafter extracting said destination address from said packet; thereafter comparing said destination address to each of a plurality of stored addresses associated with one or more ports of the repeater; and thereafter disrupting a retransmission of said packet from a first port of the ports of the repeater when said destination address does not match any stored address associated with said first port;

disrupting a retransmission of said packet from a second port of the ports of the repeater when said destination address does not match any stored address associated with said second port; wherein the method further comprises the step of:

inhibiting said disrupting step for said first port, responsive to a first security enable register, when said first security enable register indicates security for said first port is disabled to retransmit said packet from said first port from the repeater without regard to a result of said comparing step.

\* \* \* \* \*

UNITED STATES PATENT AND TRADEMARK OFFICE
CERTIFICATE OF CORRECTION

PATENT NO. : 5,640,393
DATED : June 17, 1997
INVENTOR(S) : William Lo, et. al.

It is certified that error appears in the above-indentified patent and that said Letters Patent is hereby corrected as shown below:

Column 19, line 60, delete "match" and insert --match-enabled--.
Column 20, line 4, delete "match" and insert --match-- (1st occurrence)

Signed and Sealed this

Nineteenth Day of October, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,640,393
DATED : June 17, 1997
INVENTOR(S) : William Lo and Ian Crayford It is certified that error appears in the above-identified patent and that said Letters Patent is hereby corrected as shown below:

At column 19, line 60, please delete "match" and substitute therefor --match-enabled--.

At column 20, line 4, please delete "match" (first occurrence) and substitute therefor --match-enabled--.

This certificate supercedes Certificate of Correction issued October 19, 1999.

Signed and Sealed this

Eighteenth Day of April, 2000

Attest:

Q. TODD DICKINSON

*Attesting Officer*    *Director of Patents and Trademarks*